(12) United States Patent
Zhang et al.

(10) Patent No.: US 10,757,417 B2
(45) Date of Patent: Aug. 25, 2020

(54) AFFINE MOTION COMPENSATION IN VIDEO CODING

(71) Applicant: QUALCOMM Incorporated, San Diego, CA (US)

(72) Inventors: Kai Zhang, San Diego, CA (US); Wei-Jung Chien, San Diego, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/246,952

(22) Filed: Jan. 14, 2019

(65) Prior Publication Data

US 2019/0230361 A1   Jul. 25, 2019

Related U.S. Application Data

(60) Provisional application No. 62/619,783, filed on Jan. 20, 2018.

(51) Int. Cl.
| | |
|---|---|
| *H04N 19/139* | (2014.01) |
| *H04N 19/42* | (2014.01) |
| *H04N 19/52* | (2014.01) |
| *H04N 19/109* | (2014.01) |
| *H04N 19/176* | (2014.01) |
| *H04N 19/513* | (2014.01) |

(Continued)

(52) U.S. Cl.
CPC ......... *H04N 19/139* (2014.11); *H04N 19/109* (2014.11); *H04N 19/176* (2014.11); *H04N 19/42* (2014.11); *H04N 19/52* (2014.11); *H04N 19/521* (2014.11); *H04N 19/527* (2014.11); *H04N 19/537* (2014.11)

(58) Field of Classification Search
CPC .. H04N 19/109; H04N 19/139; H04N 19/176; H04N 19/521; H04N 19/42; H04N 19/52; H04N 19/527; H04N 19/537
See application file for complete search history.

(56) References Cited

U.S. PATENT DOCUMENTS

2018/0070102 A1* 3/2018 Zhang ................. H04N 19/119

OTHER PUBLICATIONS

Chen J., et al., "JVET-G1001—Algorithm Description of Joint Exploration Test Model 7 (JEM7)", Joint Video Exploration Team (JVET)of ITU-T SG 16 WP 3 and ISO/IEC JTC 1/SC 29/WG 11, 7th Meeting, Jul. 13, 2017-Jul. 21, 2017, Torino , Aug. 19, 2017 (Aug. 19, 2017), 48 Pages, XP030150980, Retrieved from the Internet: URL:http://phenix.int-evry.fr/jvet/doc_end_user/documents/7_Torino/wg11/JVET-G0001-v1.zip.

(Continued)

*Primary Examiner* — Anner N Holder
(74) *Attorney, Agent, or Firm* — Qualcomm Incorporated

(57) ABSTRACT

A device for video decoding a current block of video data, the device including one or more processors configured to compute a horizontal component of a motion vector and to compute a vertical component of a motion vector in an affine model. The affine model may be a four-parameter affine model which includes two control point motion vectors, or a six-parameter affine model which includes three control point motion vectors. The horizontal and vertical components may include differences between control point motion vectors based on first-bit shift operations and second bit-shift operations.

11 Claims, 9 Drawing Sheets

(51) Int. Cl.
*H04N 19/527* (2014.01)
*H04N 19/537* (2014.01)

(56) References Cited

OTHER PUBLICATIONS

Han H., et al., "Control-Point Representation and Differential Coding Affine-Motion Compensation," IEEE Transactions on Circuits and Systems for Video Technology, Institute of Electrical and Electronics Engineers, US, vol. 23 (10), Oct. 1, 2013, pp. 1651-1660, XP011528531, ISSN: 1051-8215, DOI: 10.1109/TCSVT.2013.2254977 [retrieved on Sep. 30, 2013].
International Search Report and Written Opinion—PCT/US2019/014046—ISA/EPO—dated Mar. 25, 2019.
Li L., et al., "An Affine Motion Compensation Framework for High Efficiency Video Coding," 2015 IEEE International Symposium on Circuits and Systems (ISCAS), Lisbon, 2015, pp. 525-528.
Zou F., et al.,"EE4: Improved affine motion prediction", 4th JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/,, No. JVET-D0121, Oct. 6, 2016, XP030150372, 4 pages.

\* cited by examiner

AFFINE MOTION COMPENSATION IN VIDEO CODING

CLAIM OF PRIORITY

This Application claims the benefit of U.S. Provisional Application No. 62/619,783 filed on Jan. 20, 2018, the entire content of which is hereby incorporated by reference.

TECHNICAL FIELD

This disclosure is related to inter-picture prediction, more specifically, using affine motion compensation. It may be applied to future video coding standards.

BACKGROUND

Digital video capabilities may be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as tree blocks, coding units (CUs) and/or coding nodes. Video blocks in an intra-coded (I) slice of a picture are encoded using spatial prediction with respect to reference samples in neighboring blocks in a same value picture. Video blocks in an inter-coded (P or B) slice of a picture may use spatial prediction with respect to reference samples in neighboring blocks in a same value picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

This disclosure relates to a device for video decoding a current block of video data, including one or more processors configured to compute a horizontal component of a motion vector of the affine-model by adding a first bit-shift operation result to a zeroth control point motion vector horizontal component. The first bit-shift operation result is determined based on a first bit-shift operation on a first difference product and a second difference product. The first difference product includes a first difference multiplied by a horizontal pixel location within the current block of video data. The first difference is based on a difference between horizontal components of the zeroth control point motion vector and a first control point motion vector.

In addition, the one or more processors are configured to compute a vertical component of a motion vector of the affine-model by adding a second bit-shift operation result to a zeroth control point motion vector vertical component. The second bit-shift operation result is determined based on a second bit shift operation on a third difference product. The third difference product includes a third difference multiplied by a horizontal pixel location within the current block of video data. The third difference is based on a difference between vertical components of the zeroth control point motion vector and a first control point motion vector. In addition, the device includes a memory configured to store a reconstructed current block of video data.

Moreover, the decoding computes the second difference product that includes a second difference of the four-parameter affine model, multiplied by a vertical pixel location within the current block of video data. The second difference is based on a difference between vertical components of the zeroth control point motion vector and the first control point motion vector. The fourth difference product includes a fourth difference multiplied by a vertical pixel location within the current block of video data. The fourth difference is based on a difference between horizontal components of the zeroth control point motion vector and the first control point motion vector.

In addition, the one or more processors, in the decoding device, are configured to compute the horizontal component of the affine model wherein the affine model is a six-parameter affine model. The second difference product includes a second difference multiplied by a vertical pixel location within the current block of video data. The second difference is based on a difference between vertical components of the zeroth control point motion vector and the second control point motion vector. In addition, the one or more processors are configured to compute the vertical component of the affine model when the affine model is a six-parameter affine model. The fourth difference product includes a fourth difference multiplied by a vertical pixel location within the current block of video data. The fourth difference is based on a difference between vertical components of the zeroth control point motion vector and the second control point motion vector.

The techniques are also directed to a method for video decoding a current block of video data. The method includes computing a horizontal component of a motion vector of the affine-model by adding a first bit-shift operation result to a zeroth control point motion vector horizontal component. The method also includes that the first bit-shift operation result is determined based on a first bit-shift operation on a first difference product and a second difference product. The first difference product includes a first difference multiplied by a horizontal pixel location within the current block of video data. The first difference is based on a difference between horizontal components of the zeroth control point motion vector and a first control point motion vector.

In addition, the method includes computing a vertical component of a motion vector of the affine-model by adding a second bit-shift operation result to a zeroth control point motion vector vertical component. The method also includes that the second bit-shift operation result is determined based on a second bit shift operation on a third difference product. The third difference product includes a third difference multiplied by a horizontal pixel location within the current block of video data. The third difference is based on a difference between vertical components of the zeroth control point motion vector and a first control point motion vector. In addition, the method includes reconstructing the current block of video data.

Moreover, when the affine model is a four-parameter affine model, the second difference product includes a second difference multiplied by a vertical pixel location within the current block of video data. The second difference is based on a difference between vertical components of the zeroth control point motion vector and the first control point motion vector. The fourth difference product includes a fourth difference multiplied by a vertical pixel location within the current block of video data. In addition, the fourth difference is based on a difference between horizontal components of the zeroth control point motion vector and the first control point motion vector.

In addition, the method includes computing the horizontal component of the affine model wherein the affine model is a six-parameter affine model. The second difference product includes a second difference multiplied by a vertical pixel location within the current block of video data. The second difference is based on a difference between vertical components of the zeroth control point motion vector and the second control point motion vector. In addition, the method includes computing the vertical component of the affine model when the affine model is a six-parameter affine model. The fourth difference product includes a fourth difference multiplied by a vertical pixel location within the current block of video data. The fourth difference is based on a difference between vertical components of the zeroth control point motion vector and the second control point motion vector.

This disclosure also relates to an apparatus that includes means for video decoding a current block of video data. the apparatus includes means for computing a horizontal component of a motion vector of the affine-model by adding a first bit-shift operation result to a zeroth control point motion vector horizontal component. The apparatus also includes that the first bit-shift operation result is determined based on a first bit-shift operation on a first difference product and a second difference product. The first difference product includes a first difference multiplied by a horizontal pixel location within the current block of video data. The first difference is based on a difference between horizontal components of the zeroth control point motion vector and a first control point motion vector.

In addition, the apparatus includes means for computing a vertical component of a motion vector of the affine-model by adding a second bit-shift operation result to a zeroth control point motion vector vertical component. The apparatus also includes that the second bit-shift operation result is determined based on a second bit shift operation on a third difference product. The third difference product includes a third difference multiplied by a horizontal pixel location within the current block of video data. The third difference is based on a difference between vertical components of the zeroth control point motion vector and a first control point motion vector. In addition, the apparatus includes means for reconstructing the current block of video data.

Moreover, when the affine model is a four-parameter affine model, the second difference product includes a second difference multiplied by a vertical pixel location within the current block of video data. The second difference is based on a difference between vertical components of the zeroth control point motion vector and the first control point motion vector. The fourth difference product includes a fourth difference multiplied by a vertical pixel location within the current block of video data. In addition, the fourth difference is based on a difference between horizontal components of the zeroth control point motion vector and the first control point motion vector.

In addition, the apparatus includes means for computing the horizontal component of the affine model wherein the affine model is a six-parameter affine model. The second difference product includes a second difference multiplied by a vertical pixel location within the current block of video data. The second difference is based on a difference between vertical components of the zeroth control point motion vector and the second control point motion vector. In addition, the apparatus includes means for computing the vertical component of the affine model when the affine model is a six-parameter affine model. The fourth difference product includes a fourth difference multiplied by a vertical pixel location within the current block of video data. The fourth difference is based on a difference between vertical components of the zeroth control point motion vector and the second control point motion vector.

This disclosure relates to a device for video encoding a current block of video data, including one or more processors configured to compute a horizontal component of a motion vector of the affine-model by adding a first bit-shift operation result to a zeroth control point motion vector horizontal component. The first bit-shift operation result is determined based on a first bit-shift operation on a first difference product and a second difference product. The first difference product includes a first difference multiplied by a horizontal pixel location within the current block of video data. The first difference is based on a difference between horizontal components of the zeroth control point motion vector and a first control point motion vector.

In addition, the one or more processors are configured to compute a vertical component of a motion vector of the affine-model by adding a second bit-shift operation result to a zeroth control point motion vector vertical component. The second bit-shift operation result is determined based on a second bit shift operation on a third difference product. The third difference product includes a third difference multiplied by a horizontal pixel location within the current block of video data. The third difference is based on a difference between vertical components of the zeroth control point motion vector and a first control point motion vector. In addition, the device includes a memory configured to store a reconstructed current block of video data.

Moreover, the encoding computes the second difference product that includes a second difference of the four-parameter affine model, multiplied by a vertical pixel location within the current block of video data. The second difference is based on a difference between vertical components of the zeroth control point motion vector and the first control point motion vector. The fourth difference product includes a fourth difference multiplied by a vertical pixel location within the current block of video data. The fourth difference is based on a difference between horizontal components of the zeroth control point motion vector and the first control point motion vector.

In addition, the one or more processors, in the encoding device, are configured to compute the horizontal component of the affine model wherein the affine model is a six-parameter affine model. The second difference product includes a second difference multiplied by a vertical pixel location within the current block of video data. The second difference is based on a difference between vertical components of the zeroth control point motion vector and the second control point motion vector. In addition, the one or more processors are configured to compute the vertical component of the affine model when the affine model is a six-parameter affine model. The fourth difference product includes a fourth difference multiplied by a vertical pixel location within the current block of video data. The fourth difference is based on a difference between vertical components of the zeroth control point motion vector and the second control point motion vector.

This disclosure also relates to a computer readable medium having stored thereon instructions that when executed by one or more processors configured to compute a horizontal component of a motion vector of the affine-model by adding a first bit-shift operation result to a zeroth control point motion vector horizontal component. The first bit-shift operation result is determined based on a first bit-shift operation on a first difference product and a second difference product. The first difference product includes a first difference multiplied by a horizontal pixel location within the current block of video data. The first difference is based on a difference between horizontal components of the zeroth control point motion vector and a first control point motion vector.

In addition, the computer readable medium having stored thereon instructions that when executed by one or more processors are configured to compute a vertical component of a motion vector of the affine-model by adding a second bit-shift operation result to a zeroth control point motion vector vertical component. The second bit-shift operation result is determined based on a second bit shift operation on a third difference product. The third difference product includes a third difference multiplied by a horizontal pixel location within the current block of video data. The third difference is based on a difference between vertical components of the zeroth control point motion vector and a first control point motion vector. In addition, the computer readable medium having stored thereon instructions that when executed by one or more processors are configured to store a reconstructed current block of video data.

Moreover, the computer readable medium having stored thereon instructions that when executed by one or more processors are configured to compute the second difference product that includes a second difference of the four-parameter affine model, multiplied by a vertical pixel location within the current block of video data. The second difference is based on a difference between vertical components of the zeroth control point motion vector and the first control point motion vector. The fourth difference product includes a fourth difference multiplied by a vertical pixel location within the current block of video data. The fourth difference is based on a difference between horizontal components of the zeroth control point motion vector and the first control point motion vector.

In addition, the computer readable medium having stored thereon instructions that when executed by one or more processors are configured to compute the horizontal component of the affine model wherein the affine model is a six-parameter affine model. The second difference product includes a second difference multiplied by a vertical pixel location within the current block of video data. The second difference is based on a difference between vertical components of the zeroth control point motion vector and the second control point motion vector. In addition, the computer readable medium having stored thereon instructions that when executed by one or more processors are configured to compute the vertical component of the affine model when the affine model is a six-parameter affine model. The fourth difference product includes a fourth difference multiplied by a vertical pixel location within the current block of video data. The fourth difference is based on a difference between vertical components of the zeroth control point motion vector and the second control point motion vector.

In addition, the device includes a computer readable medium having stored thereon instructions that when executed by one or more processors store a reconstructed current block of video data.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
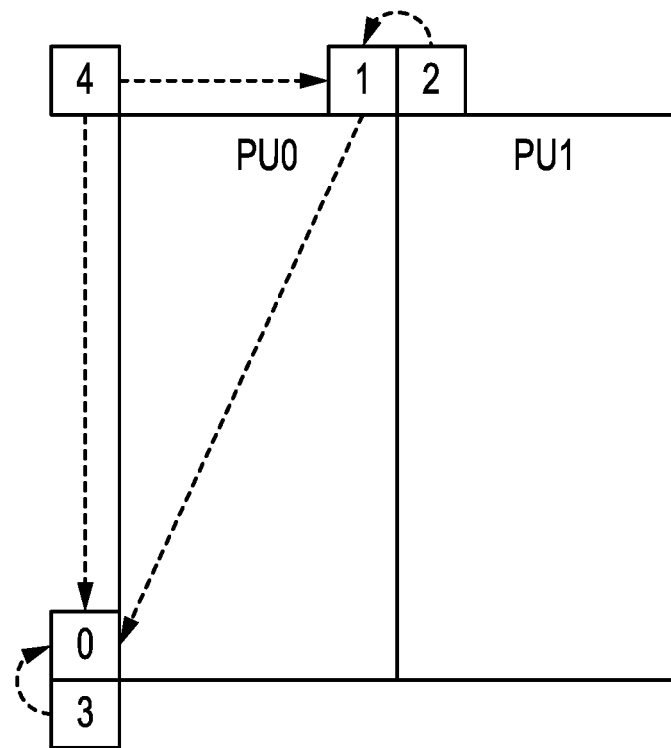
FIG. 1A illustrates spatial neighboring normal merge candidates in merge mode and FIG. 1B illustrates spatial neighboring normal merge candidates in AMVP mode.

Affine Motion Compensation was introduced as a coding tool in the Joint Exploration Model (JEM) developed by the Joint Video Exploration Team, following the development of HEVC. In JEM, both four-parameter and six-parameter affine motion models were introduced. These affine motion models often offer improvements on coding gains for motion due to non-translational movement, e.g., zooming and rotation. However, the existing formulas used in the four-parameter and six-parameter affine models rely on making divisions that may rely on a divider circuit in hardware, e.g., an Application Specific Integrated Circuit (ASIC).

For example, a divider circuit may be implemented by using a multi-step process based on multiplications, subtractions, and searching for numbers that are less than or larger than other numbers (e.g., a dividend). The multi-step process to compute a division by a divider circuit is inefficient when compared to performing a bit-shift operation to accomplish division.

Additional context of the solution will be described with reference to the figures, and in the detailed description below.

Motion Information

In H.265/HEVC, for each block, a set of motion information may be available. A set of motion information may contain motion information for forward and backward prediction directions. Forward and backward prediction directions are two prediction directions of a bi-directional prediction mode and the terms "forward" and "backward" do not necessarily have a geometrical meaning, instead they correspond to reference picture list 0 (RefPicList0) and reference picture list 1 (RefPicList1) of a current picture. When only one reference picture list is available for a picture or slice, only RefPicList0 may be available and the motion information of each block of a slice is forward.

For each prediction direction, the motion information may contain a reference index and a motion vector. In some cases, for simplicity, a motion vector itself may be referred to in a way that it is assumed that it has an associated reference index. A reference index may be used to identify a reference picture in the current reference picture list (RefPicList0 or RefPicList1). A motion vector has a horizontal and a vertical component.

POC

Picture order count (POC) is widely used in video coding standards to identify a display order of a picture. Although there are cases where two pictures within one coded video sequence may have a same value POC value, it often does not happen within a coded video sequence. When multiple coded video sequences are present in a bitstream, pictures with a same value of POC may be closer to each other in terms of decoding order.

POC values of pictures are often used for reference picture list construction, and derivation of reference picture set, as in, HEVC and motion vector scaling.

CU Structure in HEVC

In HEVC, the largest coding unit in a slice is called a coding tree block (CTB). A CTB contains a quad-tree the nodes of which are coding units. The size of a CTB may be ranges from 16×16 to 64×64 in the HEVC main profile (although technically 8×8 CTB sizes may be supported). A coding unit (CU) could be a same value size of a CTB although and as small as 8×8. Each coding unit is coded with one mode. When a CU is inter coded, it may be further partitioned into two prediction units (PUs) or become just one PU when further partition does not apply. When two PUs are present in one CU, they may be half size rectangles or two rectangle size with ¼ or ¾ size of the CU.

When the CU is inter coded, one set of motion information is present for each PU. In addition, each PU is coded with a unique inter-prediction mode to derive the set of motion information. In HEVC, the smallest PU sizes are 8×4 and 4×8.

Motion Prediction in HEVC

In the HEVC standard, there are two inter prediction modes, named merge (skip is considered as a special case of merge) and advanced motion vector prediction (AMVP) modes respectively for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to five ("5") candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors may be further refined.

As may be seen above, a merge candidate corresponds to a full set of motion information while an AMVP candidate contains just one motion vector for a specific prediction direction and reference index.

The candidates for both modes are derived similarly from a same value spatial and temporal neighboring blocks.

In JEM, now being referred to as Versatile Video Coding (VVC) as of April 2018, the MV candidate list may contain up to seven ("7") candidates for the merge mode.

Spatial Neighboring Candidates

Spatial MV candidates are derived from the neighboring blocks shown on FIG. 1, for a specific PU ($PU_0$), although the methods generating the candidates from the blocks differ for merge and AMVP modes.

FIG. 1A illustrates spatial neighboring normal merge candidates in merge mode

In merge mode, up to four spatial MV candidates may be derived with the orders showed on FIG. 1A with numbers, and the order is the following: left (0), above (1), above right (2), below left (3), and above left (4), as shown in FIG. 1A. Pruning operations may be applied to remove identical MV candidates.

Figure 1B:
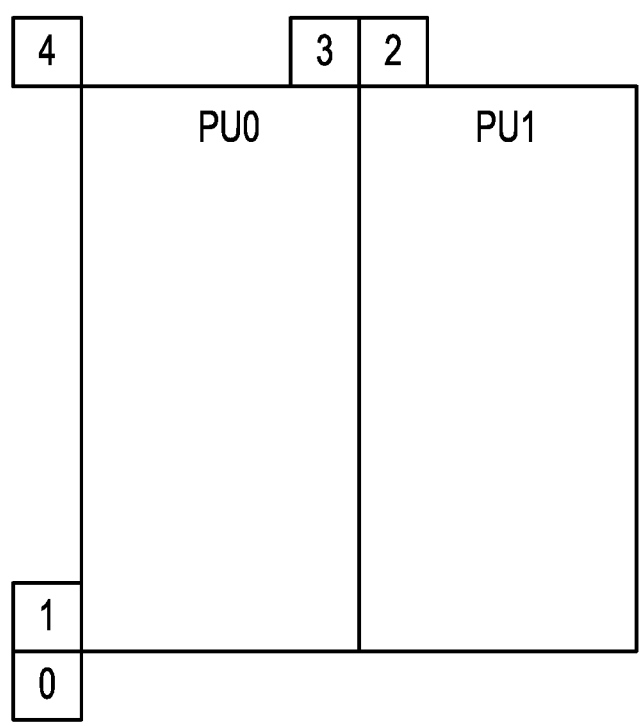

FIG. 1B illustrates spatial neighboring normal merge candidates in AMVP mode.

In AVMP mode, the neighboring blocks are divided into two groups: left group consisting of the block 0 and 1, and above group consisting of the blocks 2, 3, and 4 as shown on FIG. 1B. For each group, the potential candidate in a neighboring block referring to a same value reference picture as that indicated by the signaled reference index has the highest priority to be chosen to form a final candidate of the group. It is possible that all neighboring blocks do not contain a motion vector pointing to a same value reference picture. Therefore, if such a candidate cannot be found, the first available candidate will be scaled to form the final candidate, thus the temporal distance differences may be compensated.

Motion Compensation in H.265/HEVC

Motion compensation in H.265/HEVC are used to generate a predictor for the current inter-coded block. Quarter pixel accuracy motion vector is used and pixel values at fractional positions are interpolated using neighboring integer pixel values for both luma and chroma components.

Affine Motion Prediction in JVET Activities

In the current existing video codec standards, prior to VVC, only a translational motion model is applied for motion compensation prediction (MCP). While in the real world, there exists many kinds of motions, e.g. zoom in/out, rotation, perspective motions and the other irregular motions. If we still only apply translation motion model for MCP in such test sequences with irregular motions, it will affect the prediction accuracy and result in low coding efficiency.

For many years, attempts have been made to design algorithms to improve MCP for higher coding efficiency.

Four-Parameter (Two MVs) Affine and

Figure 2:
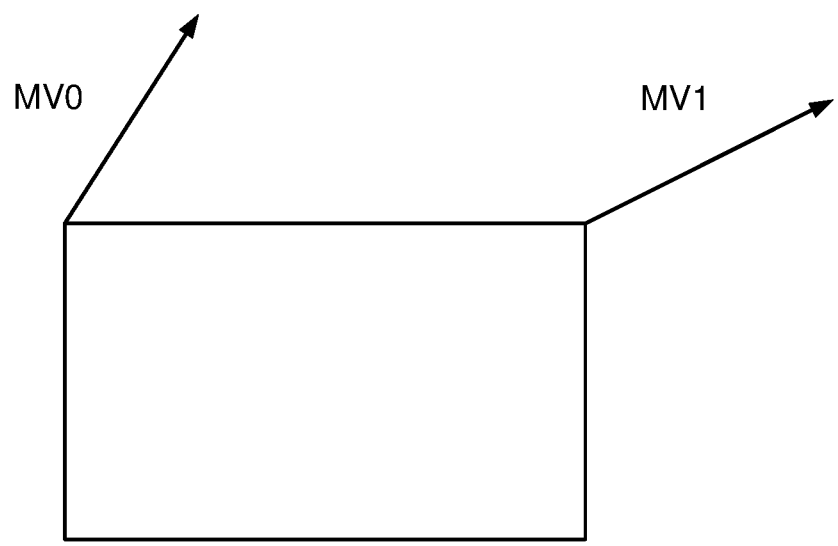
FIG. 2 illustrates two-control MV points for a four-parameter affine model.

FIG. 2 illustrates two-control MV points for a four-parameter affine model. An affine merge and affine inter modes are proposed to deal with affine motion models with 4 parameters as $$\begin{cases} mv_x = ax - by + c \\ mv_y = bx + ay + d \end{cases} \quad (1)$$

where $(vx_0, vy_0)$ is the control point motion vector on top left corner, and $(vx_1, vy_1)$ is another control point motion vector on above right corner of the block as shown in FIG. 2. The affine mode may be represented as $$\begin{cases} mv_x = \frac{(mv_{1x} - mv_{0x})}{w} x - \frac{(mv_{1y} - mv_{0y})}{w} y + mv_{0x} \\ mv_y = \frac{(mv_{1y} - mv_{0y})}{w} x + \frac{(mv_{1x} - mv_{0x})}{w} y + mv_{0y} \end{cases} \quad (2)$$

where w is the width of the block. In the current JEM software, the affine motion prediction is only applied to square blocks. However, according to an example, the affine motion prediction may be applied to non-square blocks. Similar to the conventional translation motion coding, two modes (i.e., inter mode with motion information signaled and merge mode with motion information derived) may be supported for affine motion coding.

Affine Inter Mode

For every CU/PU whose size is equal to or larger than 16×16, AF_INTER mode may be applied as follows. If the current CU/PU is in AF_INTER mode, an affine flag in CU/PU level is signalled in the bitstream. An affine motion vector prediction (MVP) candidate list with two candidates as $\{(MVP^0_0, MVP^0_1), (MVP^1_0, MVP^1_1)\}$ is built. Rate-distortion cost is used to determine which whether $(MVP^0_0, MVP^0_1)$ or $(MVP^1_0, MVP^1_1)$ is selected as the affine motion vector prediction of the current CU/PU. If $(MVP^x_0, MVP^x_1)$ is selected, then $MV_0$ is coded with $MVP^x_0$ as the prediction and $MV_0$ is coded with $MVP^x_1$ as the prediction. The index to indicate the position of the selected candidate in the list is signalled for the current block in the bit-stream.

The construction procedure of the affine MVP candidate list is as follows. Collect MVs from three groups. For example, G0: {MV-A, MV-B, MV-C}, G1: {MV-D, MV-E}, G2 {MV-F, MV-G}.

Figure 3:
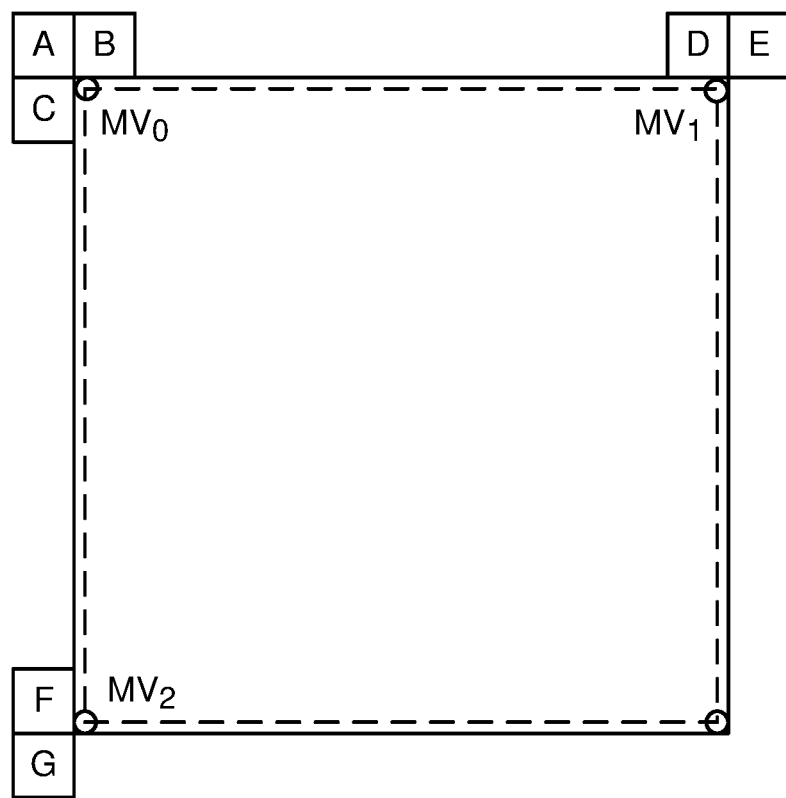
FIG. 3 illustrates an exemplary Affine Inter mode.

FIG. 3 illustrates an exemplary Affine_Inter mode. Block A, B, C, D, E, F and G are shown in FIG. 3. First, take the motion vector of the block that is referring to the target reference picture. Then, if that's not available, use the motion vector that matches the motion vector scaled to the target reference picture.

For a triple (MV0, MV1, MV2) from G0, G1, G2, derive a MV2' from MV0 and MV1 with the affine model. Second, compute D(MV0, MV1, MV2), |MV2−MV2'|. Third, search through all triples from G0, G1 and G2, and find the triple (MV00, MV01, MV02) which produces the minimum D. After producing the minimum D, set $MVP^0_0$=MV00, $MVP^0_1$=MV01. If more than one available triple exists, find the triple (MV10, MV11, MV12) which produces the second minimum D. After producing the second minimum D then set $MVP^1_0$=MV10, $MVP^1_1$=MV11. If the candidates are not fulfilled, i.e., found, then the MVP candidates for non-affine prediction block are derived for the current block. For example, the MVP candidates for a non-affine prediction block are MVP_nonaff0 and MVP_nonaff1. If $(MVP^1_0, MVP^1_1)$ cannot be found from the triple search, then set $MVP^1_0$=$MVP^1_1$=MVP_nonaff0.

After the MVP of the current affine CU/PU is determined, affine motion estimation is applied and the $(MV^0_0, MV^0_1)$ is found. Then the difference of $(MV^0_0, MV^0_1)$ and $(MVP^x_0, MVP^x_1)$ is coded in the bit stream.

Affine motion compensation prediction mentioned above is applied to generate the residues of the current CU/PU. Finally, the residues of the current CU/PU are transformed, quantized, and coded into the bit stream.

Affine Merge Mode

Figure 4A:
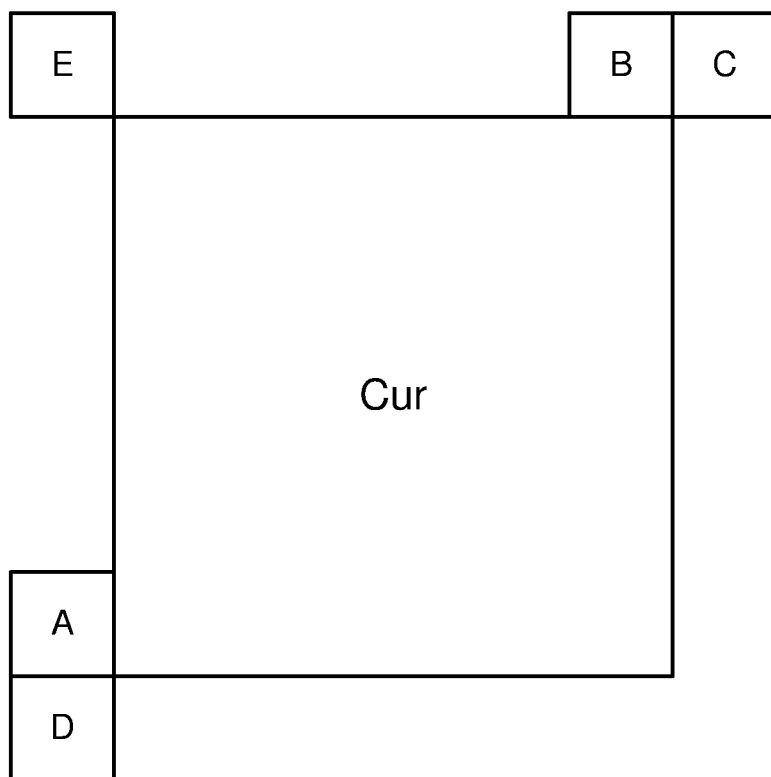
FIG. 4A and FIG. 4B illustrate examples of merge candidates.
Figure 4B:
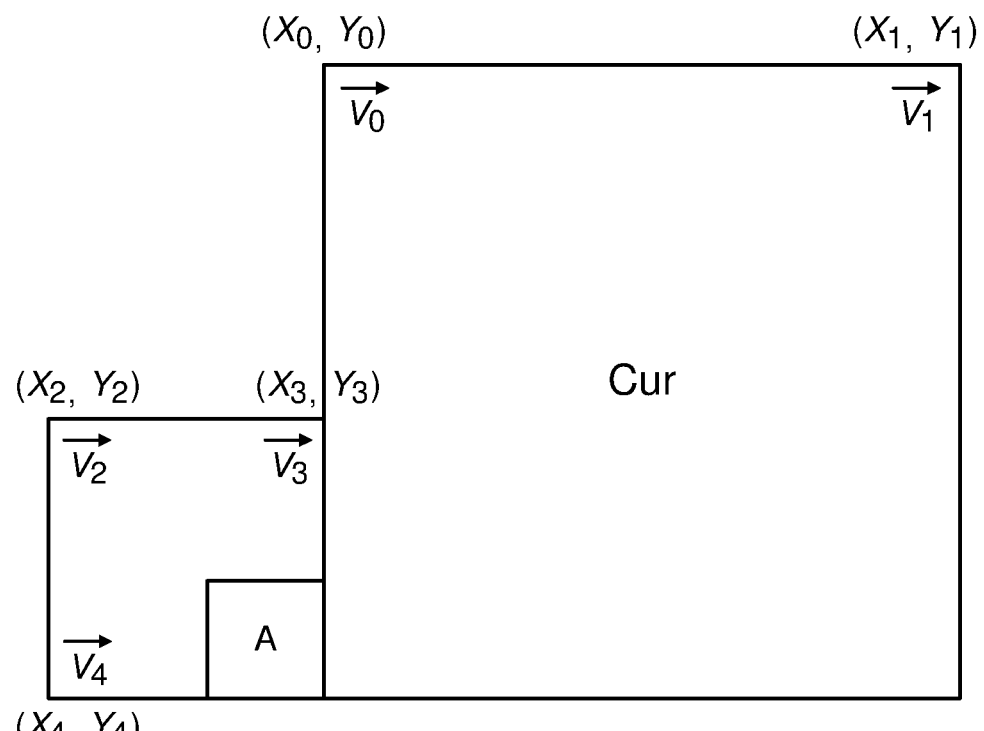

FIG. 4A and FIG. 4B illustrate examples of merge candidates. When the current CU/PU is applied in AF_MERGE mode, the first block is coded with affine mode from the valid neighbor reconstructed blocks. And the selection order for the candidate block is from left, above, above right, left bottom to above left as shown in FIG. 4A. For example, if the neighbor left bottom block A is coded in affine mode as shown in FIG. 4B, the motion vectors $v_2$, $v_3$ and $v_4$ of the top left corner, above right corner and left bottom corner of the CU/PU which contains the block A are derived. The motion vector $v_0$ of the top left corner on the current CU/PU is calculated according to $v_2$, $v_3$ and $v_4$. Similarly, the motion vector $v_1$ of the above right of the current CU/PU is calculated based on $v_2$, $v_3$, and $v_4$.

After the CPMV of the current CU/PU $v_0$ and $v_1$ are calculated according to the simplified affine motion model defined in equation (2), the MVF of the current CU/PU is generated. Then the Affine Motion Compensated Prediction ("MCP") is applied.

In order to identify whether the current CU/PU is coded with the AF_MERGE mode, an affine flag is signalled in the bit stream when there is at least one neighbor block coded in affine mode. If no affine block neighbor to the current block exists as shown in FIG. 4A, then an affine flag will not be written in the bitstream.

To indicate the affine merge mode, one affine_flag is signaled if the merge flag is 1. If the affine_flag is 1, the current block is coded with the affine merge mode, and no merge index is signaled. If affine_flag is 0, the current block is coded with the normal merge mode, and a merge index is signaled followingly. The table below shows the syntax design.

| | |
|---|---|
| merge_flag | ae |
| if( merge_flag){ | |
|     affine_flag | ae |
|     if(!affine_flag) | |
|         merge_index | ae |
| } | |

Entropy Coding for Affine Model

In HEVC, context-adaptive binary arithmetic coding (CABAC) is used to convert a symbol into a binarized value, in a process called binarization. Binarization enables efficient binary arithmetic coding via a unique mapping of non-binary syntax elements to a sequence of bits, which are called bins.

In the JEM2.0 reference software, for the affine merge mode, only the affine flag is coded, and the merge index is inferred to be the first available neighboring affine model in the predefined checking order A-B-C-D-E as shown in FIG. 4A. This checking order is similar to what was discussed with respect to FIG. 1A. Where the left (0) has block A prioritized first before blocks B-E. Then the above (1), block B, is prioritized next, over blocks C-E. Followed by the above right (2), block C, is prioritized over block D-E. The below left (3), block D, is prioritized over block E. Finally, the above left (4), block E, is prioritized last.

For the affine inter mode, two MVD syntaxes are coded for each prediction list indicating the motion vector difference between derived affine motion vector and predicted motion vector.

Six-Parameter (Three MVs) Affine

Figure 5:
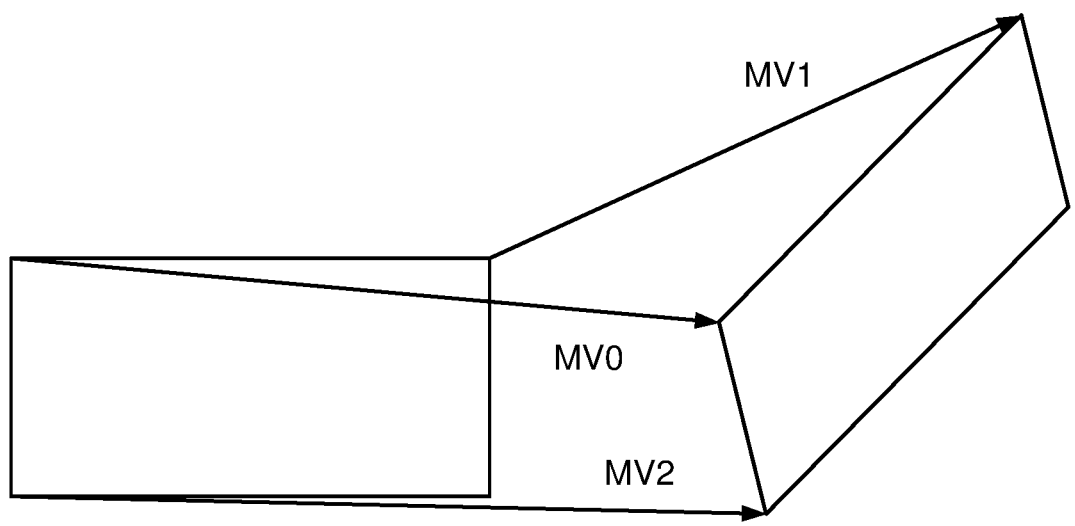
FIG. 5 illustrates three-control MV points for a six-parameter affine model.

FIG. 5 illustrates three-control MV points for a six-parameter affine model.

A block with affine prediction may choose to use a four-parameter affine model or six-parameter affine model adaptively.

An affine model with six ("6") parameters is defined as $$\begin{cases} mv_x = ax + by + e \\ mv_y = cx + dy + f \end{cases} \quad (3)$$

An affine model with six ("6") parameters has three control points. In other words, an affine model with six ("6") parameters is determined by three motion vectors as shown in FIG. 5. MV0 is the first control point motion vector in the top left corner. MV1 is the second control point motion vector in the above right corner of the block. MV2 is the third control point motion vector in the left bottom corner of the block, as shown in FIG. 2.

The affine model built with the three motion vectors is calculated as $$\begin{cases} mv_x = \frac{(mv_{1x} - mv_{0x})}{w}x + \frac{(mv_{2x} - mv_{0x})}{h}y + mv_{0x} \\ mv_y = \frac{(mv_{1y} - mv_{0y})}{w}x + \frac{(mv_{2y} - mv_{0y})}{h}y + mv_{0y} \end{cases} \quad (4)$$

More Motion Vector Prediction Methods for Affine

In a similar manner as the affine-merge mode to derive the motion vectors of the top left corner and the above right corner, the affine model may also be used to derive the MVPs for the top left corner, the above right corner and the below left corner.

MVD1 can be Predicted from MVD in the Affine Mode.

The affine merge and normal merge modes can be added into the merge candidate list.

Sub-Block Decision in JEM

Figure 6A:
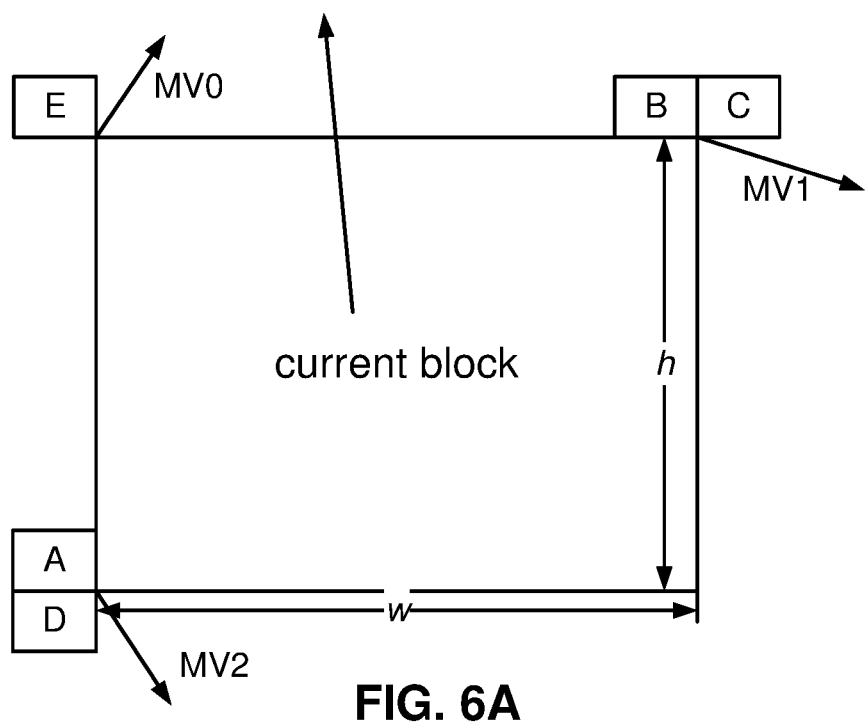
FIG. 6A illustrates a single block motion compensation and FIG. 6B illustrates a sub-block motion compensation.

FIG. 6A illustrates a single block motion compensation. In the JEM software, affine motion compensation introduces sub-block motion compensation. Unlike the traditional single block motion compensation where the whole block has only one motion vector for a reference list as shown in FIG. 6A, FIG. 6B illustrates a sub-block motion compensation with different motion vectors.

Figure 6B:
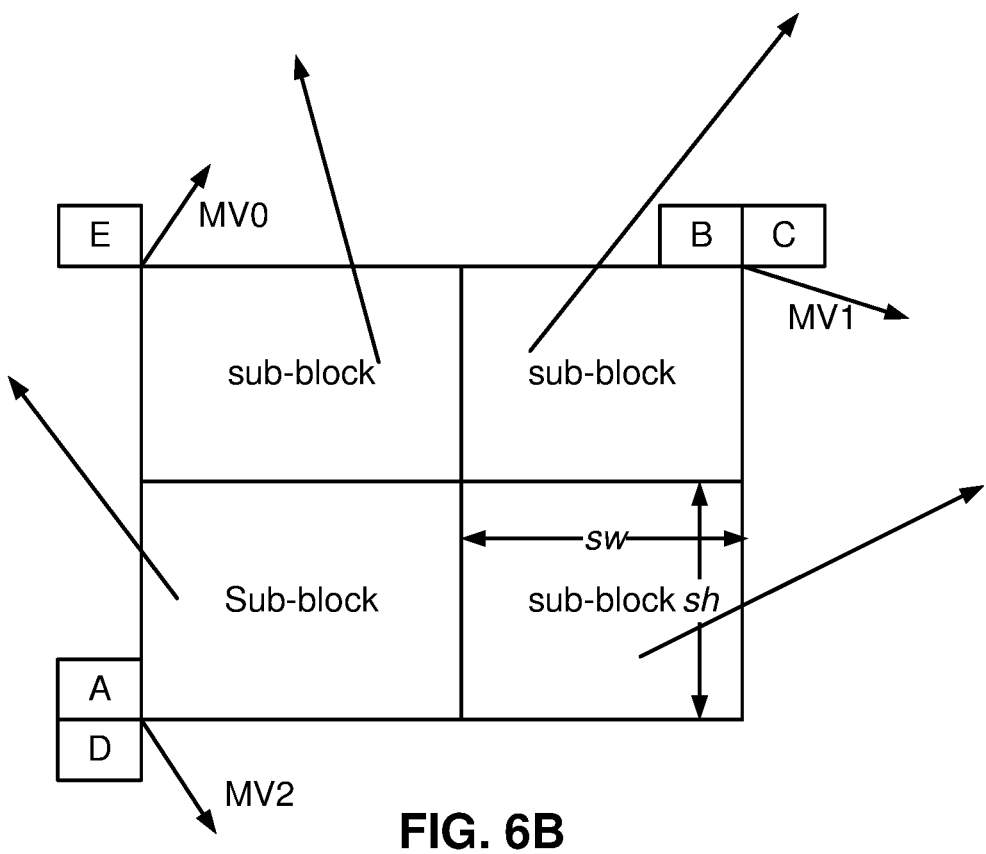

The sub-block motion compensation allows a block of video data to be divided into more than one sub-blocks with different motion vectors for a reference list as shown in FIG. 6B.

In the JEM software an algorithm to determine the sub-block size for affine motion compensation, both at encoder and decoder is used. The algorithm makes ids described below and characterizes the current block size as having dimensions w×h, where w is the width, and h is the height of the current block. Each sub-block of the current block has a width (sw) and height (sh) and are determined as described below.

The width of the sub-block size may be determined by selecting the maximum value, mvWx between the absolute value of the difference of a first control point motion vector horizontal component, $mv_{1x}$, and a second control point motion vector horizontal component, $mv_{ox}$, and the absolute value of the difference of a first control point motion vector vertical component, $mv_{1y}$, and a second control point motion vector vertical component, $mv_{oy}$. The width of the current block of video data, w, is used to performa bit-shift operation. By right-shifting w by p bit positions, and selecting the maximum value between those operands (w>>p and mvWx, as shown below), and 1, the value of sw is determined. While the modulus of the width of the block, w, divided by the sub-block width, sw, is not equal to zero, the sub-block width decreases (sw--). The sub-block width sw is the maximum between the pervious sw and ww (sw=max {sw, ww}).

$$mvWx = \max\{|mv_{1x} - mv_{0x}|, |mv_{1y} - mv_{0y}|\}$$

$$sw = \max\left\{\frac{(w >> p)}{mvWx}, 1\right\}$$

while(w % sw != 0)

{ sw--;

}

$$sw = \max\{sw, ww\}$$

Similarly, the height of the sub-block size may be determined by selecting the maximum value, mvWy between the absolute value of the difference of a third control point motion vector horizontal component, $mv_{2x}$, and a second control point motion vector horizontal component, $mv_{ox}$, and the absolute value of the difference of a first control point motion vector vertical component, $mv_{1y}$, and a second control point motion vector vertical component, $mv_{oy}$. The height of the current block of video data, h, is used to performa bit-shift operation. By right-shifting h by p bit positions, and selecting the maximum value between those operands (w>>p and mvWy, as shown below), and 1, the value of sh is determined. While the modulus of the height of the block, h, divided by the sub-block width, sh, is not equal to zero, the sub-block height decreases (sh--). The sub-block width sh is the maximum between the pervious sh and hh (sh=max {sh, hh}).

$$mvWy = \max\{|mv_{2x} - mv_{0x}|, |mv_{2y} - mv_{0y}|\}$$

$$sh = \max\left\{\frac{(h >> p)}{mvWy}, 1\right\}$$

while(h % sh != 0)

{ sh--;

} sh=max {sh, hh}, and p is a motion precision offset equal to 2 in JEM. ww×hh is the smallest sub-block size defined as 4×4 in JEM.

In the affine motion compensation design in JEM, several division operations are involved, which are not desirable in practical video coding implementations. To address this issue, embodiments include affine motion compensation approaches based on bit-shift operations as described above.

Embodiments include video encoders and decoders that include affine motion compensation process using bit-shift operations in accordance with the techniques of this disclosure. The following features may be applied individually or in any suitable combination in a particular embodiment.

In some embodiments, the affine motion compensation procedure, at the decoder using bit-shift operations, includes but is not limited to, the procedure of figuring out the affine motion vector prediction, deriving the affine merge candidates, determining the sub-block size in affine motion compensation and calculating the motion vectors for each pixel or each sub-block in the affine model.

In some of the affine model forms below, the off function may be used. The off function is outlined below. A block width, w is defined to be $w=2^{wb}$. The four-parameter affine model as defined in (2) may be replaced by the following equations, $$\text{off}(m, n) = \begin{cases} n >> 1 & \text{if } m >= 0 \\ -(n >> 1) & \text{Otherwise} \end{cases}$$

$$\text{sign}(m) = \begin{cases} 1 & \text{if } m >= 0 \\ -1 & \text{Otherwise} \end{cases}$$

An affine model may be used by either the encoder, the decoder or both, as each device performs operations that require motion vector estimation.

The horizontal component, $mv_x$, of the motion vector of the four-parameter affine model, and vertical component, $mv_y$, of the motion vector of the four-parameter affine model may be written as in form (1) below:

$$\begin{cases} mv_x = (((mv_{1x} - mv_{0x})x) >> wb) - (((mv_{1y} - mv_{0y})y) >> wb) + mv_{0x} \\ mv_y = (((mv_{1y} - mv_{0y})x) >> wb) - (((mv_{1x} - mv_{0x})y) >> wb) + mv_{0y} \end{cases},$$

A device for encoding or decoding a current block of video data that uses an affine model for video coding, may implement bit-shift operations to gain efficiencies in performance. By implementing bit-shift operations an express division "A/B" may be implemented. If B, as an example, is a power of 2, e.g. B=8, A/8 may be implemented as A>>3. As 8 is 2 to the power 3, and dividing A by 8 is the equivalent of left-shifting by 3-bit positions. It is may desirable to not have non-integer number be the result of a division when computing affine modeling. If A=1, the result of A>>3 is ⅛. To avoid a factional result where resolution of the bits of A may be lost, A may be scaled to a larger number to normalize A. A may represent the number of pixels in a dimension of a current block of video data. For example, if there are 128 pixels as the maximum width or height of a current block of video data, A may normalized to a value of 128, where 128 is 2 to the power 7. A bit-shift position normalization factor may also be used in the numerator. Thus, A>>3, may equal 128/8=16. However, as the numerator, A, was normalized, the denominator may also be normalized by the normalization factor. Instead of writing, A>>3, the equivalent operation may be represented as A>>(normalization factor-4), where in this example the normalization factor is 7. Hence, A>>(7-4)=A>>3. A person having ordinary skill in the art would recognize that when processing digital values and digital constants, techniques to normalize digital values as described in this paragraph are commonly used. For the purpose of clarity, reference to normalization factors are omitted for clarity, but are generally applicable to any of the various affine model forms described in this disclosure, e.g., affine model form (1), affine model form (2), . . . affine model form (18).

The affine model forms described herein have some common operations between them. The affine models may be implemented by one or more processors in an encoder device or decoder device that are configured to compute a first difference comprising of a first control point motion vector horizontal component minus a second control point motion vector horizontal component, e.g., in a four-parameter affine model: $mv_{1x}-mv_{0x}$. The encoder or decoder device may also compute a second difference comprising of a first control point motion vector vertical component minus a second control point motion vector vertical component, e.g., in a four-parameter affine model: $mv_{1y}-mv_{0y}$. Note than in a six-parameter affine model, the second difference may be computed with an additional (third) control point motion vector mv2. Thus, the second difference may alternatively be written as comprising of a third control point motion vector horizontal component minus a second control point motion vector horizontal component, in a six-parameter affine model is $mv_{2x}-mv_{0x}$.

In some of the four parameter affine models, the first difference product may include multiplying the first difference by a horizontal pixel location (x) within the current block of video data. In addition, in some of the four parameter affine models, the second difference product may include multiplying the second difference by a vertical pixel location (y) within the current block of video data. Alternatively, in some of the six parameter affine models, the second difference product may include multiplying the second difference by a vertical pixel location (y) within the current block of video data.

Moreover, in some of the four parameter affine models, the third difference product comprises multiplying the third difference by a horizontal pixel location (x) within the current block of video data. In addition, in some of the four parameter affine models, the fourth difference product includes multiplying the fourth difference by a vertical pixel location (y) within the current block of video data. Alternatively, in some of the six parameter affine models, the second difference product includes multiplying the fourth difference by a vertical pixel location (y) within the current block of video data.

A number of the affine model forms have common elements. For example, affine model form (1), affine model form (2), affine model form (3), affine model form (7), affine model form (8), affine model form (10), affine model form (11) and affine model form (16) have the common elements described below.

Common Elements of a Number of Affine Models.

Horizontal Components

Each of the affine models whether the four-parameter affine model or the six-parameter affine model include a computation of a horizontal component of a motion vector, $mv_x$, and a computation of a vertical component of a motion vector, $mv_y$.

For affine model forms (1), (2), (3), (10) and (11) which are four-parameter affine models a decoder or encoder device may include one or more processors configured to compute a horizontal component of a motion vector, $mv_x$, of the affine-model, by adding a result of the first bit-shift operation to a zeroth control point motion vector horizontal component, $mv_{x0}$, and based on a first bit-shift operation on a first difference product, $(mv_{1x}-mv_{0x})x$, and a second difference product, $(mv_{1y}-mv_{0y})y$.

The first difference product $(mv_{1x}-mv_{0x})x$ includes multiplying a first difference, $mv_{1x}-mv_{0x}$, by a horizontal pixel location, x, within the current block of video data. Similarly, the second difference product $(mv_{1y}-mv_{0y})y$, includes multiplying a second difference, $(mv_{1y}-mv_{0y})$, by a vertical pixel location, y, within the current block of video data. Note that the first difference, $mv_{1x}-mv_{0x}$, is based on a difference between horizontal components of the zeroth control point motion vector, mv0, and a first control point motion vector mv1. Similarly, the second difference $(mv_{1y}-mv_{0y})$, is based on a difference between vertical components of the zeroth control point motion vector and the first control point motion vector.

For affine model forms (7), (8), and (16) which are six-parameter affine models a decoder or encoder device may include one or more processors configured to compute a horizontal component of a motion vector, $mv_x$, of the affine-model, by adding a result of the first bit-shift operation to a zeroth control point motion vector horizontal component, $mv_{x0}$, and based on a first bit-shift operation on a first difference product, $(mv_{1x}-mv_{0x})x$, and a second difference product, $(mv_{2x}-mv_{0x})x$.

The first difference product $(mv_{1x}-mv_{0x})x$ includes multiplying a first difference, $mv_{1x}-mv_{0x}$, by a horizontal pixel location, x, within the current block of video data. Similarly, the second difference product $(mv_{2x}-mv_{0x})x$, includes multiplying a second difference, $(mv_{2x}-mv_{0x})$, by a vertical pixel location, x, within the current block of video data. Note that the first difference, $mv_{1x}-mv_{0x}$, is based on a difference between horizontal components of the zeroth control point motion vector, mv0, and a first control point motion vector mv1. Similarly, the second difference $(mv_{2x}-mv_{0x})$, is based on a difference between horizontal components of the zeroth control point motion vector and the second control point motion vector.

Vertical Components

For affine model forms (1), (2), (3), (10) and (11) which are four-parameter affine models a decoder or encoder device may include one or more processors configured to compute a vertical component $mv_y$ of a motion vector of the affine-model, if the affine model is the four-parameter affine model, by adding a result of the second bit-shift operation to the zeroth control point motion vector vertical component, $mv_{0y}$, and based on a second bit-shift operation on a third difference product, $(mv_{1y}-mv_{0y})x$, and a fourth difference product, $(mv_{1x}-mv_{0x})y$.

The third difference product $(mv_{1y}-mv_{0y})x$ includes multiplying a third difference $(mv_{1y}-mv_{0y})$ by a horizontal pixel location, x, within the current block of video data. Similarly, the fourth difference product $(mv_{1x}-mv_{0x})y$ includes multiplying a fourth difference $(mv_{1x}-mv_{0x})$ by a vertical pixel location, y, within the current block of video data. The third difference $mv_{1x}-mv_{0y}$ is based on a difference between horizontal components of the zeroth control point motion vector and the first control point motion vector. The fourth difference $mv_{1x}-mv_{0x}$ is based on a difference between vertical components of the zeroth control point motion vector, $mv_{0y}$, and the first control point motion vector, $mv_{1y}$.

For affine model forms (7), (8), and (16) which are six-parameter affine models a decoder or encoder device may include one or more processors configured to compute a compute a vertical component of a motion vector of the affine-model, if the affine model is the six-parameter affine model, by and adding the result of the second bit-shift operation to the zeroth control point motion vector vertical component, $mv_{0y}$, and based on a second bit-shift operation on a third difference product $(mv_{1y}-mv_{0y})x$ and a fourth difference product $(mv_{2y}-mv_{0y})y$.

The third difference product $(mv_{1y}-mv_{0y})x$ includes multiplying a third difference $(mv_{1y}-mv_{0y})$ by the horizontal pixel location, x, within the current block of video data. The fourth difference product $(mv_{2y}-mv_{0y})y$ includes multiplying a fourth difference $(mv_{2y}-mv_{0y})$ by a vertical pixel location, y, within the current block of video data. The third difference $(mv_{1y}-mv_{0y}$ is based on a difference between vertical components of the zeroth control point motion vector $mv_{0y}$, and a first control point motion vector, $mv_{1y}$.

The fourth difference $mv_{2y}-mv_{0y}$ is based on difference between vertical components of the zeroth control point motion vector, $mv_{0y}$, and a second control point motion vector, $mv_{2y}$.

As part of the decoding, there may be a reconstructed current block of video data stored in memory.

The third difference $mv_{1y}-mv_{0y}$ of the four-parameter affine model is the second difference $(mv_{1y}-mv_{0y})$ of the four-parameter affine model multiplied by a minus 1. The fourth difference of the four-parameter affine model is the first difference $mv_{1x}-mv_{0x}$ of the four-parameter affine model.

The zeroth control point motion vector horizontal component, $mv_{0x}$, the first control point motion vector horizontal component, $mv_{1x}$, the second control point motion vector horizontal component, $mv_{2x}$, the zeroth point motion vector vertical component, $mv_{0y}$, the first control point motion vector vertical component, $mv_{1y}$, and the second control point motion vector, $mv_{2y}$, are each bit-shifted by an integer number.

In affine model form (1) which is the four-parameter affine model, the first bit-shift operation on the first difference product $(mv_{1x}-mv_{0x})x$ and the second difference product $mv_{1y}-mv_{0y})y$ is computed once by a first digital constant, wb, on the difference between the first difference product and the second difference product, i.e., $((mv_{1x}-mv_{0x})x-(mv_{1y}-mv_{0y})y)\gg wb$.

The second bit-shift operation on the third difference product $(mv_{1y}-mv_{0y})x$ and the fourth difference product $(mv_{1x}-mv_{0x})y$ is computed once by a first digital constant, wb, on the difference between the third difference product, and the fourth difference product, i.e., $((mv_{1y}-mv_{0y})x-(mv_{1x}-mv_{0x})y)\gg wb$.

The first digital constant, wb, is a positive integer number between 1 and 7.

The maximum number, wb, may be a function of the block size. For example, in a block size (e.g., 128×128), the max value of wb is two to the power 7 which is 128.

If the block size were 256×256, then wb max would be two to the power 8, which is 256. If the block size where 64×64, then wb max would be two to the power 6, which is 64. wb designates the width generally. For a square block of 128×128, the height (sometimes designated as hb), is the same as wb. However, for a non-square block, e.g., 64×128, the value of wb would be 6, and the value of hb would be 7. The explanation of what value wb or hb may take applies to other forms below where either wb or hb is used and/or described.

The first control point motion vector horizontal component is defined as $mv_{1x}$. The zeroth control point motion vector horizontal component is defined as $mv_{0x}$. The first control point motion vector vertical component is defined as $mv_{1y}$. The zeroth control point motion vector vertical component is defined as $mv_{0y}$.

The second difference and the third difference may be an equivalent value. The first difference and the fourth difference may be an equivalent value.

Note that in form (1) each difference of motion vectors may be bit-shifted by wb. Alternatively, another form of the horizontal component, $mv_x$, of the motion vector of the four-parameter affine model, and vertical component, $mv_y$, of the motion vector of the four-parameter affine model may be re-written as in affine model form (2) below:

$$\begin{cases} mv_x = (((mv_{1x} - mv_{0x})x - (mv_{1y} - mv_{0y})y) >> wb) + mv_{0x} \\ mv_y = (((mv_{1y} - mv_{0y})x + (mv_{1x} - mv_{0x})y) >> wb) + mv_{0y} \end{cases}$$

Note that in form (2) the combination of differences of motion vectors for each the horizontal component and vertical component of the motion vector of four parameter affine model, may be bit-shifted by wb. Thus, in contrast to form (1) above, in form (2) there may be two bit-shifts by wb instead of four bit-shifts by wb.

The affine model form (2) which is a four-parameter affine model, in addition to the common elements, also includes a first bit-shift operation by a first digital constant, wb, on the first difference product and the second difference product is computed twice. The first bit-shift operation is computed once on the first difference product, and once on the second difference product.

The second bit-shift operation by the first digital constant, wb, on the third difference product and the fourth difference product is computed twice, once on the third difference product, and once on the fourth difference product.

The first digital constant, wb, is a positive integer number between 1 and 7. The first control point motion vector horizontal component is defined as $mv_{1x}$. The zeroth control point motion vector horizontal component is defined as $mv_{0x}$. The first control point motion vector vertical component is defined as $mv_{1y}$. The zeroth control point motion vector vertical component is defined as $mv_{0y}$. The second difference and the third difference may be an equivalent value. The first difference and the fourth difference may be an equivalent value.

Alternatively, yet another form of the horizontal component, $mv_x$, of the motion vector of the four-parameter affine model, and vertical component, $mv_y$, of the motion vector of the four-parameter affine model may be re-written as in affine model form (3) below:

$$d_x^{10} = mv_{1x} - mv_{0x}; d_y^{10} = mv_{1y} - mv_{0y};$$

$$\begin{cases} mv_x = ((d_x^{10}x + \text{off}(d_x^{10}x, w)) >> wb) - \\ ((d_y^{10}y + \text{off}(d_y^{10}y, w)) >> wb) + mv_{0x} \\ mv_y = ((d_y^{10}x + \text{off}(d_y^{10}x, w)) >> wb) + \\ ((d_x^{10}y + \text{off}(d_x^{10}y, w)) >> wb) + mv_{0y} \end{cases}$$

Note that in affine model form (3), wb may be applied four times, i.e., >>wb (a right shift by wb) is computed four times.

The affine model form (3) which is the four-parameter affine model, and in addition to the common elements, also includes other operations described here. The first bit-shift operation by the first digital constant on the first difference product is also performed as part of an off (first difference product, w) function operation. The first bit-shift operation by the first digital constant on the second difference product is also performed as part of an off (second difference product, w) function operation. The second bit-shift operation by the first digital constant on the third difference product is also performed as part of an off (third difference product, w) function operation. The second bit-shift operation by the first digital constant on the fourth difference product is also performed as part of an off (fourth difference product, w) function operation. w is the width of the current block of video data, and is defined as $w=2^{wb}$. The first digital constant wb is a positive integer number between 1 and 7. The first control point motion vector horizontal component is defined as $mv_{1x}$. The zeroth control point motion vector horizontal component is defined as $mv_{0x}$. The first control point motion vector vertical component is defined as $mv_{1y}$. The zeroth control point motion vector vertical component is defined as $mv_{0y}$. The second difference and the third difference may be an equivalent value. The first difference and the fourth difference may be an equivalent value.

Alternatively, an additional form of the horizontal component, $mv_x$, of the motion vector of the four-parameter affine model, and vertical component, $mv_y$, of the motion vector of the four-parameter affine model may be re-written as in form (4) below:

$$d_x^{10} = mv_{1x} - mv_{0x}; d_y^{10} = mv_{1y} - mv_{0y};$$

$$\text{offw} = w >> 1$$

$$\begin{cases} mv_x = \text{sign}(d_x^{10}x) \times ((|d_x^{10}x| + \text{offw}) >> wb) - \\ \text{sign}(d_y^{10}y) \times ((|d_y^{10}y| + \text{offw}) >> wb) + mv_{0x} \\ mv_y = \text{sign}(d_y^{10}x) \times ((|d_y^{10}x| + \text{offw}) >> wb) + \\ \text{sign}(d_x^{10}y) \times ((|d_x^{10}y| + \text{offw}) >> wb) + mv_{0y} \end{cases}$$

Note that in affine model form (4), wb may be applied four times, i.e., >>wb (a right shift by wb) is computed four times.

Alternatively, yet another additional form of the horizontal component, $mv_x$, of the motion vector of the four-parameter affine model, and vertical component, $mv_y$, of the motion vector of the four-parameter affine model may be re-written as in affine model form (5) below:

$$d_x^{10} = mv_{1x} - mv_{0x}; d_y^{10} = mv_{1y} - mv_{0y};$$

$$\begin{cases} mv_x = ((d_x^{10}x - d_y^{10}y + \text{off}(d_x^{10}x - d_y^{10}y, w)) >> wb) + mv_{0x} \\ mv_y = ((d_y^{10}x + d_x^{10}y + \text{off}(d_y^{10}x + d_x^{10}y, w)) >> wb) + mv_{0y} \end{cases}$$

Note that in affine model form (5), wb may be applied twice, i.e., >>wb (a right shift by wb) is computed twice.

Alternatively, yet another additional form of the horizontal component, $mv_x$, of the motion vector of the four-parameter affine model, and vertical component, $mv_y$, of the motion vector of the four-parameter affine model may be re-written as in form (6) below:

$$d_x^{10} = mv_{1x} - mv_{0x}; d_y^{10} = mv_{1y} - mv_{0y}; \text{offw} = w >> 1$$

$$\begin{cases} mv_x = \text{Sign}(d_x^{10}x - d_y^{10}y) \times ((|d_x^{10}x - d_y^{10}y| + \text{offw}) >> wb) + mv_{0x} \\ mv_y = \text{Sign}(d_y^{10}x - d_x^{10}y) \times ((|d_y^{10}x - d_x^{10}y| + \text{offw}) >> wb) + mv_{0y} \end{cases}$$

Note that in affine model form (6), wb may be applied twice, i.e., >>wb is computed twice.

Suppose the block width w=$2^{wb}$ and block height h=$2^{hb}$, the six-parameter affine model as defined in (4) can be replaced by the following affine model form (7) as shown below:

$$\begin{cases} mv_x = (((mv_{1x} - mv_{0x})x) >> wb) - (((mv_{2x} - mv_{0x})y) >> hb) + mv_{0x} \\ mv_y = (((mv_{1y} - mv_{0y})x) >> wb) + (((mv_{2y} - mv_{0y})y) >> hb) + mv_{0y} \end{cases}$$

Note that in affine model form (7), wb may be applied twice, i.e., >>wb (a right shift by wb) is computed twice; and hb may be applied twice, i.e., >>hb (a right shift by hb) is computed twice.

The affine model form (7) which is the six-parameter affine model, and in addition to the common elements, also includes other operations described here. The first bit-shift operation by the first digital constant on the first difference product and the second difference product is computed once on the difference between the first difference product and the second difference product. The first control point motion vector horizontal component is defined as $mv_{1x}$. The zeroth control point motion vector horizontal component is defined as $mv_{0x}$. The second control point motion vector horizontal component is defined as $mv_{2x}$. The first control point motion vector vertical component is defined as $mv_{1y}$. The zeroth control point motion vector vertical component is defined as $mv_{0y}$. The second control point motion vector vertical component is defined as $mv_{2y}$. The second bit-shift operation by the second digital constant on the third difference product and the fourth difference product is computed once on the difference between the third difference product and the fourth difference product. The first digital constant, wb, is a positive integer number between 1 and 7. The second digital constant, hb, is a positive integer number between 1 and 7.

Alternatively, another form of the horizontal component, $mv_x$, of the motion vector of the six-parameter affine model, and vertical component, $mv_y$, of the motion vector of the four-parameter affine model may be re-written as in affine model form (8) below:

$$d_x^{10} = mv_{1x} - mv_{0x}; d_y^{10} = mv_{1y} - mv_{0y}; d_x^{20} = mv_{2x} - mv_{0x};$$
$$d_y^{20} = mv_{2y} - mv_{0y};$$

$$\begin{cases} mv_x = ((d_x^{10}x + \text{off}(d_x^{10}x, w)) >> wb) - \\ ((d_x^{20}y + \text{off}(d_x^{20}y, h)) >> hb) + mv_{0x} \\ mv_y = ((d_y^{10}x + \text{off}(d_y^{10}x, w)) >> wb) + \\ ((d_y^{20}y + \text{off}(d_y^{20}y, h)) >> hb) + mv_{0y} \end{cases}$$

Note that in affine model form (8), wb may be applied twice, i.e., >>wb (a right shift by wb) is computed twice; and hb may be applied twice, i.e., >>hb (a right shift by hb) is computed twice.

The affine model form (8) which is the six-parameter affine model, and in addition to the common elements, also includes other operations described here. The first bit-shift operation by the first digital constant on the first difference product is also performed as part of an off (first difference product, w) function operation. The first bit-shift operation by the first digital constant on the second difference product is also performed as part of an off (second difference product, h) function operation. The second bit-shift operation by the second digital constant on the third difference product is also performed as part of an off (third difference product, w) function operation. The second bit-shift operation by the second digital constant on the fourth difference product is also performed as part of an off (fourth difference product, h) function operation. The width, w, of the current block of video data, and is defined as w=$2^{wb}$. The first digital constant is wb. The first digital constant, wb, is a positive integer number between 1 and 7. The height, h, of the current block of video data, and is defined as w=$^{hb}$. The second digital, hb, is the is a positive number between 1 and 7. The first control point motion vector horizontal component is defined as $mv_{1x}$. The zeroth control point motion vector horizontal component is defined as $mv_{0x}$. The second control point motion vector horizontal component is defined as $mv_{2x}$. The first control point motion vector vertical component is defined as $mv_{1y}$. The zeroth control point motion vector vertical component is defined as $mv_{0y}$. The second control point motion vector horizontal component is defined as $mv_{2y}$.

Alternatively, yet another form of the horizontal component, $mv_x$, of the motion vector of the six-parameter affine model, and vertical component, $mv_y$, of the motion vector of the four-parameter affine model may be re-written as in affine model form (9) below:

$$d_x^{10} = mv_{1x} - mv_{0x}; d_y^{10} = mv_{1y} - mv_{0y}; d_x^{20} = mv_{2x} - mv_{0x};$$
$$d_y^{20} = mv_{2y} - mv_{0y}; \text{offw} = w >> 1; \text{offh} = h >> 1;$$

$$\begin{cases} mv_x = \text{sign}(d_x^{10}x) \times ((|d_x^{10}x| + \text{offw}) >> wb) - \\ \text{sign}(d_x^{20}y) \times ((|d_x^{20}y| + \text{offh}) >> hb) + mv_{0x} \\ mv_y = \text{sign}(d_y^{10}x) \times ((|d_y^{10}x| + \text{offw}) >> wb) + \\ \text{sign}(d_y^{20}y) \times ((|d_y^{20}y| + \text{offh}) >> hb) + mv_{0y} \end{cases}$$

Note that in affine model form (9), wb may be applied twice, i.e., >>wb (a right shift by wb) is computed twice; and hb may be applied twice, i.e., >>hb (a right shift by hb) is computed twice.

In another embodiment, it may be desirable to divide by a non-power of two. For example, suppose the block width w and/or height h is any integer which could be unequal to $2^{wb}$ wherein m is an integer, a lookup table based solution may be utilized to represent the affine model. As an example, the four-parameter affine model may be written as in affine model form (10):

$$\begin{cases} mv_x = (((mv_{1x} - mv_{0x})x \times T[w]) >> tb) - \\ (((mv_{1y} - mv_{0y})y \times T[w]) >> tb) + mv_{0x} \\ mv_y = (((mv_{1y} - mv_{0y})x \times T[w]) >> tb) + \\ (((mv_{1x} - mv_{0x})y \times T[w]) >> tb) + mv_{0y} \end{cases}$$

Note that in affine model form (10), tb may be applied four times, i.e., >>tb (a right shift by tb) is computed four times.

The affine model form (10) which is the four-parameter affine model with a division by a number that is not a power of 2, and in addition to the common elements, also includes other operations described here. Prior to the first bit-shift operation, a look-up-table, T, is read at a pixel location w, along a width or a height of the current block of video data, T[w]. T[w] is multiplied by the first difference product, and T[w] is also multiplied by the second difference product, then the first bit-shift operation by the first digital constant is applied on the first difference product multiplied by T[w]. The first bit-shift operation by the first digital constant is applied on the second difference product multiplied by T[w]. Prior to the second bit-shift operation, the T[w] multiplied by the first difference product and the T[w] multiplied by the second difference product are used, then the second bit-shift operation by the second digital constant is applied on the second difference product multiplied by T[w].

The second bit-shift operation by the second digital constant is applied on the first difference product multiplied by T[w], and, wherein the first digital constant and the second digital constant are a same value, and the first digital constant, tb, is a positive integer number between 1 and 7.

The first control point motion vector horizontal component is defined as $mv_{1x}$. The zeroth control point motion vector horizontal component is defined as $mv_{0x}$. The first control point motion vector vertical component is defined as $mv_{1y}$. The zeroth control point motion vector vertical component is defined as $mv_{0y}$. The second difference and the third difference may be an equivalent value. The first difference and the fourth difference may be an equivalent value.

Alternatively, another form of the horizontal component, $mv_x$, of the motion vector of the four-parameter affine model, and vertical component, $mv_y$, of the motion vector of the four-parameter affine model may be re-written as in form (11) below:

$$\begin{cases} mv_x = ((((mv_{1x} - mv_{0x})x - (mv_{1y} - mv_{0y})y) \times T[w]) >> tb) + mv_{0x} \\ mv_y = ((((mv_{1y} - mv_{0y})x + (mv_{1x} - mv_{0x})y) \times T[w]) >> tb) + mv_{0y} \end{cases}$$

Note that in affine model form (11), tb may be applied twice, i.e., >>tb (a right shift by tb) is computed twice.

The affine model form (11) is the four-parameter affine model with a division by a number that is not a power of 2, and in addition to the common elements, also includes other operations described here. Prior to the first bit-shift operation, a look-up-table, T, is read at a pixel location w, along a width of the current block of video data, T[w]. T[w] is multiplied by the difference between the first difference product and the second difference product, and then the first bit-shift operation by the first digital constant is applied on the first difference product and the second difference product multiplied by T[w]. Prior to the second bit-shift operation, a look-up-table, T, is read at a pixel location w, along a height of the current block of video data, T[w]. T[w] is multiplied by the difference between the third difference product and the fourth difference product. The second bit-shift operation by the second digital constant is applied on the third difference product and the fourth difference product multiplied by T[w]. The first digital constant and the second digital constant are a same value, and the first digital constant, tb, is a positive integer number between 1 and 7.

The first control point motion vector horizontal component is defined as $mv_{1x}$. The zeroth control point motion vector horizontal component is defined as $mv_{0x}$. The first control point motion vector vertical component is defined as $mv_{1y}$. The zeroth control point motion vector vertical component is defined as $mv_{0y}$. The second difference and the third difference may be an equivalent value. The first difference and the fourth difference may be an equivalent value.

Alternatively, yet another form of the horizontal component, $mv_x$, of the motion vector of the four-parameter affine model, and vertical component, $mv_y$, of the motion vector of the four-parameter affine model may be re-written as in affine model form (12) below:

$$d_x^{10} = mv_{1x} - mv_{0x}; d_y^{10} = mv_{1y} - mv_{0y};$$

$$\begin{cases} mv_x = ((d_x^{10}x \times T[w] + \text{off}(d_x^{10}x, 2^{tb})) >> tb) - \\ \quad ((d_y^{10}y \times T[w] + \text{off}(d_y^{10}y, 2^{tb})) >> tb) + mv_{0x} \\ mv_y = ((d_y^{10}x \times T[w] + \text{off}(d_y^{10}x, 2^{tb})) >> tb) + \\ \quad ((d_x^{10}y \times T[w] + \text{off}(d_x^{10}y, 2^{tb})) >> tb) + mv_{0y} \end{cases}$$

Note that in affine model form (12), tb may be applied four times, i.e., >>tb (a right shift by tb) is computed four times.

Alternatively, an additional form of the horizontal component, $mv_x$, of the motion vector of the four-parameter affine model, and vertical component, $mv_y$, of the motion vector of the four-parameter affine model may be re-written as in affine model form (13) below:

$$d_x^{10} = mv_{1x} - mv_{0x}; d_y^{10} = mv_{1y} - mv_{0y}; \text{offt} = 2^{tb} >> 1$$

$$\begin{cases} mv_x = \text{sign}(d_x^{10}x) \times ((|d_x^{10}x| \times T[w] + \text{offt}) >> tb) - \\ \quad \text{sign}(d_y^{10}y) \times ((|d_y^{10}y| \times T[w] + \text{offt}) >> tb) + mv_{0x} \\ mv_y = \text{sign}(d_y^{10}x) \times ((|d_y^{10}x| \times T[w] + \text{offt}) >> tb) + \\ \quad \text{sign}(d_x^{10}y) \times ((|d_x^{10}y| \times T[w] + \text{offt}) >> tb) + mv_{0y} \end{cases}$$

Note that in affine model form (13), tb may be applied four times, i.e., >>tb (a right shift by tb) is computed four times.

Alternatively, another additional form of the horizontal component, $mv_x$, of the motion vector of the four-parameter affine model, and vertical component, $mv_y$, of the motion vector of the four-parameter affine model may be re-written as in affine model form (14) below:

$$d_x^{10} = mv_{1x} - mv_{0x}; d_y^{10} = mv_{1y} - mv_{0y};$$

$$\begin{cases} mv_x = (((d_x^{10}x - d_y^{10}y) \times T[w] + \text{off}(d_x^{10}x - d_y^{10}y, 2^{tb})) >> tb) + mv_{0x} \\ mv_y = (((d_y^{10}x + d_x^{10}y) \times T[w] + \text{off}(d_y^{10}x + d_x^{10}y, 2^{tb})) >> tb) + mv_{0y} \end{cases}$$

Note that in affine model form (14), tb may be applied twice, i.e., >>tb (a right shift by tb) is computed twice.

Alternatively, another additional form of the horizontal component, $mv_x$, of the motion vector of the four-parameter affine model, and vertical component, $mv_y$, of the motion vector of the four-parameter affine model may be re-written as in affine model form (15) below:

$$d_x^{10} = mv_{1x} - mv_{0x}; d_y^{10} = mv_{1y} - mv_{0y}; \text{offt} = 2^{tb} >> 1$$

$$\begin{cases} mv_x = \text{Sign}(d_x^{10}x - d_y^{10}y) \times ((|(d_x^{10}x - d_y^{10}y)| \times T[w] + \text{offt}) >> tb) + mv_{0x} \\ mv_y = \text{Sign}(d_y^{10}x + d_x^{10}y) \times ((|(d_y^{10}x + d_x^{10}y)| \times T[w] + \text{offt}) >> tb) + mv_{0y} \end{cases}$$

Note that in affine model form (15), tb may be applied twice, i.e., >>tb (a right shift by tb) is computed twice.

In a different embodiment, the horizontal component, $mv_x$, of the motion vector of the six-parameter affine model, and vertical component, $mv_y$, of the motion vector of the six-parameter affine model may be re-written as in affine model form (16) below:

$$\begin{cases} mv_x = (((mv_{1x} - mv_{0x})x \times T[w]) >> tb) - \\ \quad ((mv_{2x} - mv_{0x})y \times T[h]) >> tb)) + mv_{0x} \\ mv_y = (((mv_{1y} - mv_{0y})x \times T[w]) >> tb) - \\ \quad ((mv_{2y} - mv_{0y})y \times T[h]) >> tb)) + mv_{0y} \end{cases}$$

Note that in affine model form (16), tb may be applied four times, i.e., >>tb (a right shift by tb) is computed four times.

The affine model form (16) which is the six-parameter affine model with a division by a number that is not a power of 2, and in addition to the common elements, also includes other operations described here. Prior to the first bit-shift operation, a look-up-table, T, is read at a pixel location w, along a width of the current block of video data, T[w], and T[w] is multiplied by the first difference product, and T, is read at a pixel location h, along a height of the current block of video data, T[h].

T[h] is multiplied by the second difference product, then the first bit-shift operation by the first digital constant is applied on the first difference product multiplied by T[w]. The first bit-shift operation by the first digital constant is applied on the second difference product multiplied by T[h]. Prior to the second bit-shift operation, T[w] is multiplied by the third difference product. T[h] is multiplied by the fourth difference product, then the second bit-shift operation by the first digital constant is applied on the third difference product multiplied by T[w].

The second bit-shift operation by the second digital constant is applied on the fourth difference product multiplied by T[h], and, and the first digital constant and the second digital constant are the same, and the first digital constant, tb, is a positive number between 1 and 7.

The first control point motion vector horizontal component is defined as $mv_{1x}$. The zeroth control point motion vector horizontal component is defined as $mv_{0x}$. The second control point motion vector horizontal component is defined as $mv_{2x}$. The first control point motion vector vertical component is defined as $mv_{1y}$. The zeroth control point motion vector vertical component is defined as $mv_{0y}$. The second control point motion vector horizontal component is defined as $mv_{2y}$.

Alternatively, another form of the horizontal component, $mv_x$, of the motion vector of the six-parameter affine model, and vertical component, $mv_y$, of the motion vector of the six-parameter affine model may be re-written as in affine model form (17) below:

$$d_x^{10} = mv_{1x} - mv_{0x}; d_y^{10} = mv_{1y} - mv_{0y}; d_x^{20} = mv_{2x} - mv_{0x};$$
$$d_y^{20} = mv_{2y} - mv_{0y};$$

$$\begin{cases} mv_x = ((d_x^{10}x \times T[w] + \text{off}(d_x^{10}x, 2^{tb})) >> tb) - \\ \quad ((d_x^{20}y \times T[h] + \text{off}(d_x^{20}y, 2^{tb})) >> tb) + mv_{0x} \\ mv_y = ((d_y^{10}x \times T[w] + \text{off}(d_y^{10}x, 2^{tb})) >> tb) + \\ \quad ((d_y^{20}y \times T[h] + \text{off}(d_y^{20}y, 2^{tb})) >> tb) + mv_{0y} \end{cases}$$

Note that in affine model form (17), tb may be applied four times, i.e., >>tb (a right shift by tb) is computed four times.

Alternatively, yet another form of the horizontal component, $mv_x$, of the motion vector of the six-parameter affine model, and vertical component, $mv_y$, of the motion vector of the six-parameter affine model may be re-written as in affine model form (18) below:

$$d_x^{10} = mv_{1x} - mv_{0x}; d_y^{10} = mv_{1y} - mv_{0y}; d_x^{20} = mv_{2x} - mv_{0x};$$
$$d_y^{20} = mv_{2y} - mv_{0y}; \text{offt} = 2^{tb} >> 1;$$

$$\begin{cases} mv_x = \text{sign}(d_x^{10}x) \times ((|d_x^{10}x| \times T[w] + \text{offt}) >> tb) - \\ \quad \text{sign}(d_x^{20}y) \times ((|d_x^{20}y| \times T[h] + \text{offt}) >> tb) + mv_{0x} \\ mv_y = \text{sign}(d_y^{10}x) \times ((|d_y^{10}x| \times T[w] + \text{offt}) >> tb) + \\ \quad \text{sign}(d_y^{20}y) \times ((|d_y^{20}y| \times T[h] + \text{offt}) >> tb) + mv_{0y} \end{cases}$$

Note that in affine model form (18), tb may be applied four times, i.e., >>tb (a right shift by tb) is computed four times. Also note that the size of table T may be any integers such as 16, 32, 64, 128, 256, or 512. The table precision tb may be any integers such as 8, 12, 16, 24, 32.

A person having ordinary skill in the art would readily recognize that the various forms above may be used with other formulas that requires division in the affine motion compensation process. For example, they may be used to derive the motions for affine merge candidate. They may also be used to derive the motion vector prediction for affine inter-mode.

In a different embodiment, the size of sub-block in affine motion compensation may not be calculated for each affine block in JEM as described in 2.1.9. Instead, the size may be fixed, such as 4×4, 4×8, 8×4 or 8×8. In another example, the size may be signaled from the encoder to the decoder. For example, the width and/or height of the sub-block may be signaled in SPS/PPS/slice header. In one embodiment, sub-block is always a square so only width is signaled. Alternatively, the sub-block size may further depend on the block size.

In a different embodiment, suppose the current block size is w×h, the width (sw) and height (sh) of the sub-block in affine motion compensation may be further determined by testing the comparison correlation of delta motion vectors and size of the current block. For example, sw and sh may be determined as follows. Doing adaptive block size, depends on conditions. Conditions like max, min and if, else if mvWx=max{|$mv_{1x}$−$mv_{0x}$|,|$mv_{1y}$−$mv_{0y}$|};
sw=default_sw;
  if(8×mvWx<(w<<p)) sw=8;
  else if(16×mvWx<(w<<p)) sw=16;
sw=min{sw, w};
mvWy=max {|$mv_{2x}$−$mv_{0x}$|,|$mv_{2y}$−$mv_{0y}$|};
sh=default_sh;
  if(8×mvWy<(h<<p)) sh=8;
  else if(16×mvWy<(h<<p)) sh=16;
sh=min{sh, h};

Where p is a precision offset such as 0, 1, or 2, default_sw and default_sh represent the default width and height for the sub-block, respectively. In one embodiment, it is the difference of the motion storage precision and the interpolation precision. The default width and/or height for the sub-block may be pre-defined or signaled in the bitstream.

More Motion Vector Prediction Methods for Affine Modeling

A similar manner as affine-merge to derive the motion vectors of the top left corner and the above right corner as described with reference to Affine Merge Mode may also be used to derive the MVPs for the top left corner, the above right corner and the below left corner.

Figure 7A:
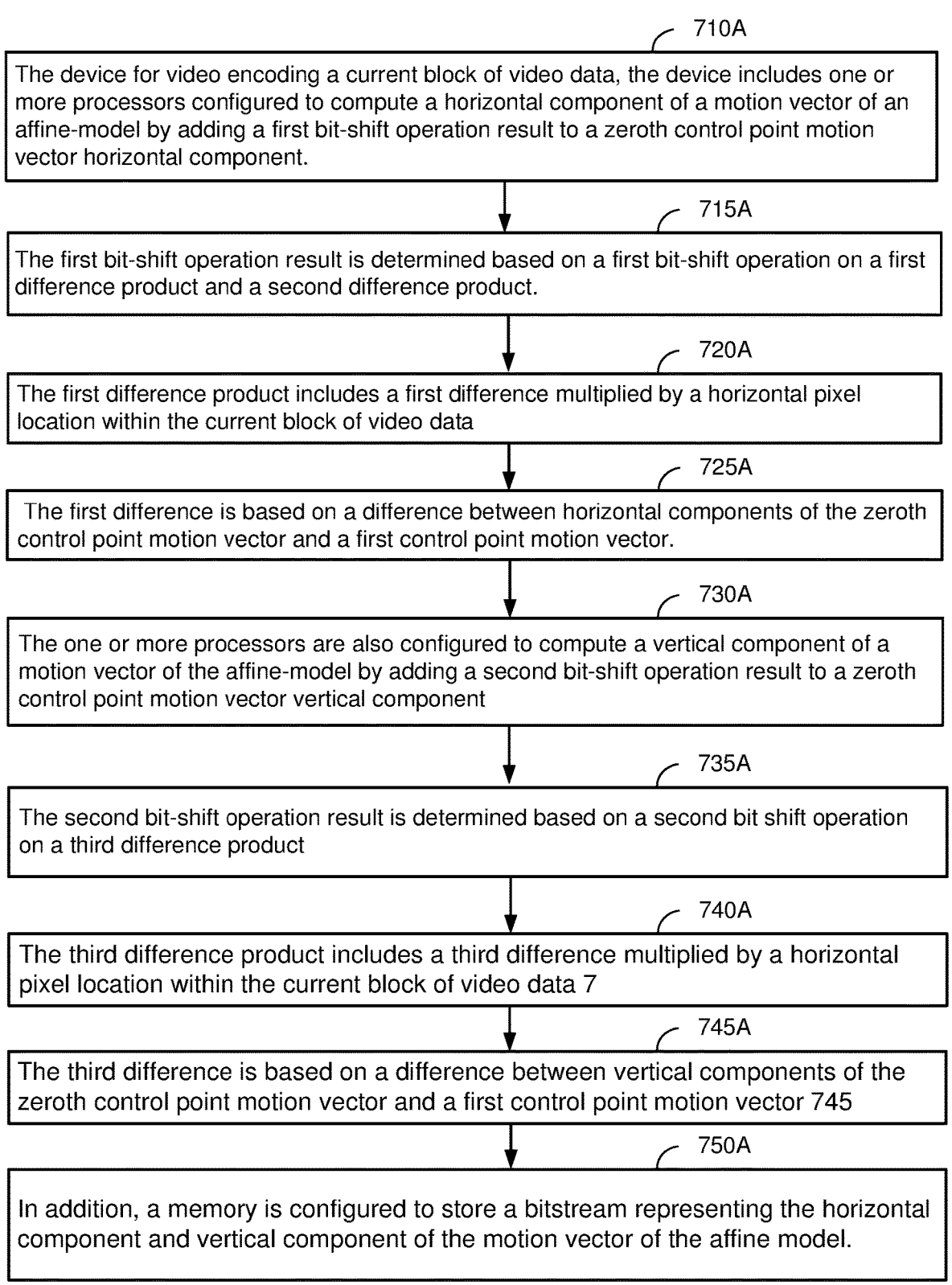
FIG. 7A illustrates a flowchart used for video encoding with one or more techniques described in this disclosure.

FIG. 7A illustrates a flowchart used for video encoding with one or more techniques described in this disclosure. The device for video encoding a current block of video data, the device includes one or more processors configured to compute a horizontal component of a motion vector of the affine-model by adding a first bit-shift operation result to a zeroth control point motion vector horizontal component 710A. The first bit-shift operation result is determined based on a first bit-shift operation on a first difference product and a second difference product 715A. The first difference product includes a first difference multiplied by a horizontal pixel location within the current block of video data 720A. The first difference is based on a difference between horizontal components of the zeroth control point motion vector and a first control point motion vector 725A.

The one or more processors are also configured to compute a vertical component of a motion vector of the affine-model by adding a second bit-shift operation result to a zeroth control point motion vector vertical component 730A. The second bit-shift operation result is determined based on a second bit shift operation on a third difference product 735A. The third difference product includes a third difference multiplied by a horizontal pixel location within the current block of video data 740A. The third difference is based on a difference between vertical components of the zeroth control point motion vector and a first control point motion vector 745A. In addition, a memory is configured to store a bitstream representing the horizontal component and vertical component of the motion vector of the affine model 750A.

Figure 7B:
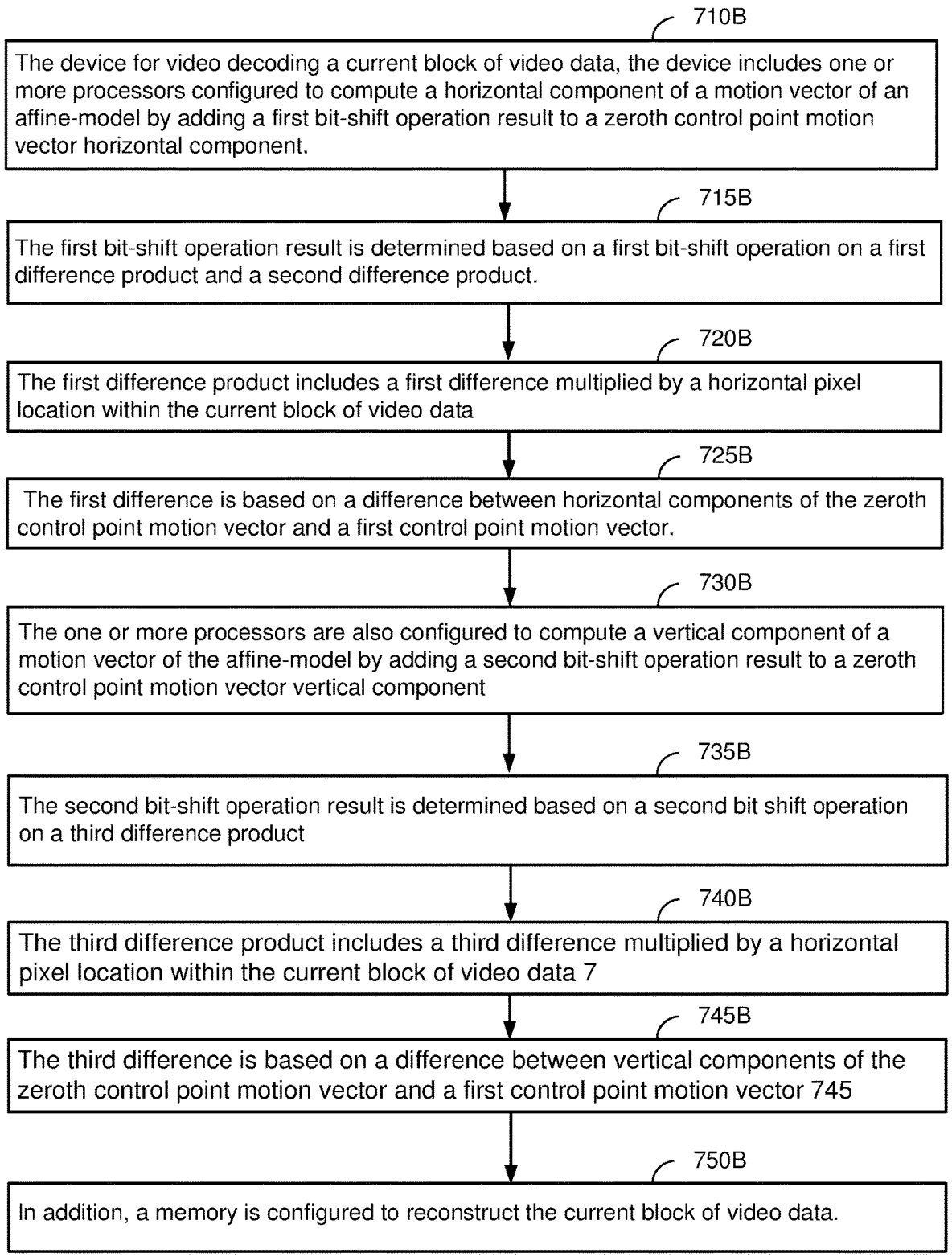
FIG. 7B illustrates a flowchart used for video decoding with one or more techniques described in this disclosure.

FIG. 7B illustrates a flowchart used for video decoding with one or more techniques described in this disclosure. The device for video decoding a current block of video data, the device includes one or more processors configured to compute a horizontal component of a motion vector of the affine-model by adding a first bit-shift operation result to a zeroth control point motion vector horizontal component 710B. The first bit-shift operation result is determined based on a first bit-shift operation on a first difference product and a second difference product 715B. The first difference product includes a first difference multiplied by a horizontal pixel location within the current block of video data 720B. The first difference is based on a difference between horizontal components of the zeroth control point motion vector and a first control point motion vector 725B.

The one or more processors are also configured to compute a vertical component of a motion vector of the affine-model by adding a second bit-shift operation result to a zeroth control point motion vector vertical component 730B. The second bit-shift operation result is determined based on a second bit shift operation on a third difference product 735B. The third difference product includes a third difference multiplied by a horizontal pixel location within the current block of video data 740B. The third difference is based on a difference between vertical components of the zeroth control point motion vector and a first control point motion vector 745B. In addition, a memory is configured to reconstruct the current block of video data 750B.

Figure 8:
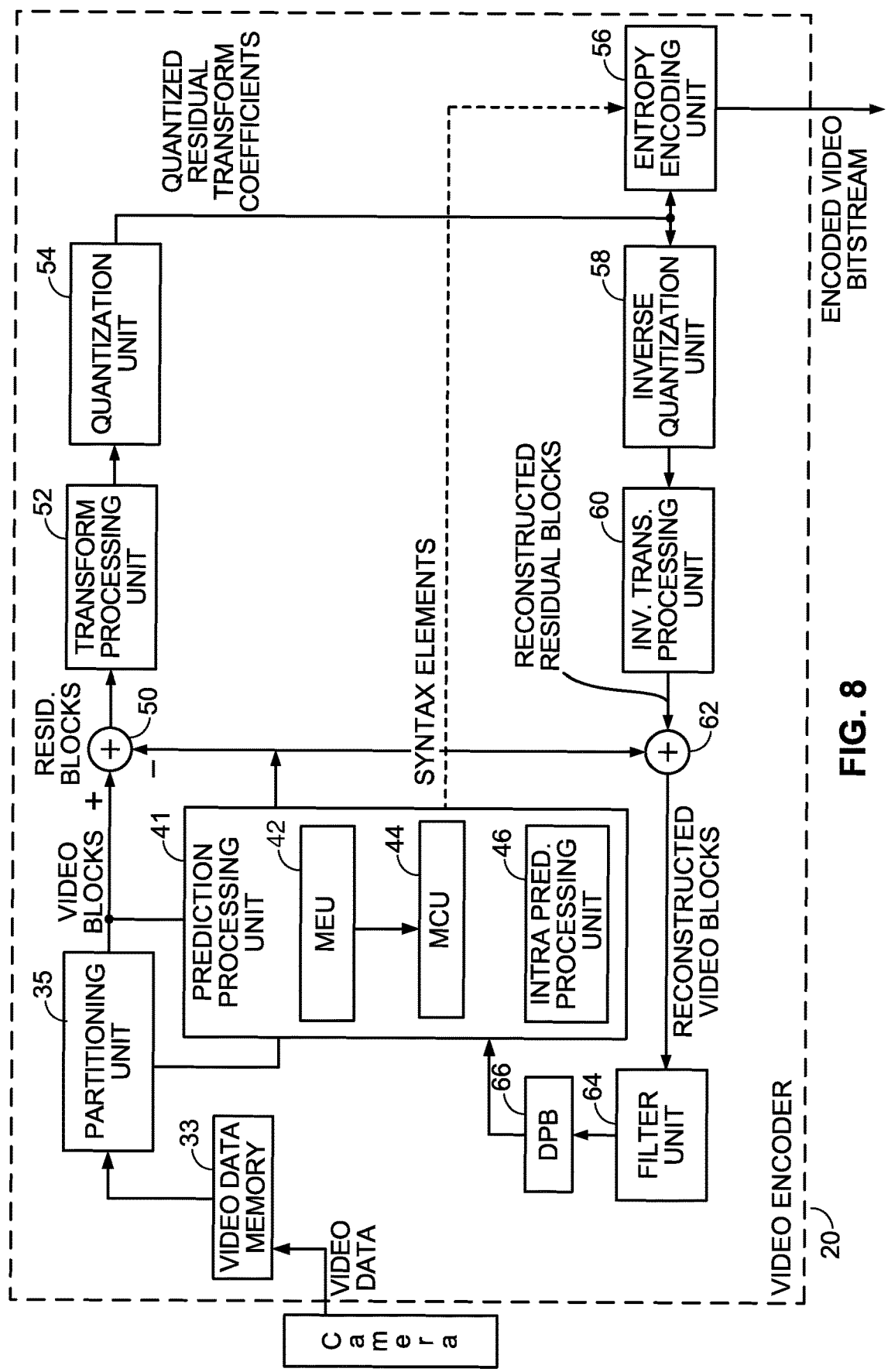
FIG. 8 illustrates an exemplary video encoder that may be used to implement one or more of the techniques described in this disclosure.

FIG. 8 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 8, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

One or more units illustrated within the video encoder 20 may be part of an Application Specific Integrated Circuit (ASIC). Alternatively, or in addition to, one or more units illustrated within the video encoder 20 may be implemented in one processor, or, alternatively in other embodiments in one or more processors.

As shown in FIG. 8, video encoder 20 receives video data from a camera and stores the received video data along with metadata in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by a same value memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. For example, in a different embodiment, the partitioning unit 35 may generate the sequence parameter set (SPS) and/or picture parameter set (PPS). Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-predicted block to summer 50 to generate residual block data and to summer 62 to reconstruct the encoded block for use as a reference picture.

The prediction processing unit 41 may also be part of one or more processors which may be configured to operate in a merge mode which processes the candidate list to predict the motion vectors of the coded block.

The candidate list may include a normal merge candidate based on selecting one or more motion vectors corresponding to translational motion. In addition, the candidate list may include an affine merge candidate based on selecting one or more motion vectors corresponding to affine motion. One or more normal merge candidates and one or more affine merge candidates may be used to construct the candidate list. The candidate list may be based on a prioritization order or a predefined order of the more than one affine merge candidates and the more than one normal merge candidates. In an example, the normal merge candidates and affine merge candidates may be associated with an index of the candidate list. A merge index, may be selected from the index of the candidate list, based on a cost associated with the normal merge candidate, or the affine merge candidate, in the candidate list. The video encoder 20 may provide the merge index in a bitstream.

The one or more motion vectors of the candidate selected, i.e., the candidate associated with the merge index, may be used to obtain a first prediction block in a reference picture used in encoding, if the encoding is based on uni-directional prediction.

Alternatively, the one or more motion vectors of the candidate selected, i.e., the candidate associated, in inter-mode, with the merge index, may be used to obtain a first prediction block in a first reference picture, and a second prediction block in a second reference picture, during encoding using bi-directional prediction. In an embodiment, the first prediction block may be the final prediction block. Alternatively, in an embodiment the second prediction block may be the final prediction block. In yet another embodiment, the final prediction may be determined from a combination of the first prediction block and the second prediction block.

Moreover, the prediction blocks in the inter-mode may also be based on motion vectors of spatial candidate blocks or temporal candidates block. As an example, the first prediction block and the second prediction block are obtained using motion vectors from spatially neighboring blocks. In another example, the first prediction block and the second prediction block are obtained based on motion vectors of temporally neighboring candidate blocks. In another example, the neighboring candidate blocks are within the group of a same value: slice, or tile or LCU or row or picture.

In another example, the neighboring candidate blocks are located in one or more previously coded frames. Moreover, the first prediction block inherits motion information from the neighboring candidate block, and the relative position of the neighboring candidate blocks is pre-defined. In addition, the second prediction block is obtained based on the motion information of a neighboring candidate block according to a predetermined rule.

Intra prediction unit 46 within prediction processing unit 41 may perform intra-predictive coding of the current video block relative to one or more neighboring blocks or samples in a same value frame or slice as the current block to be coded to provide spatial compression.

There is a motion estimation unit 42 which may be used conjunction with motion compensation unit 44 within prediction processing unit 41 and may perform inter-predictive coding of the current video block relative to one or more predictive blocks in one or more reference pictures to provide temporal compression.

Motion estimation unit 42 may be configured to determine the motion vector for a video block according to a predetermined pattern for a video sequence. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66.

For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture.

The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the final predictive block for the current video block, either via intra prediction mode or inter prediction mode, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

The calculated motion vectors sent by motion estimation unit 42 to the entropy encoding unit 56 and motion compensation unit 44, may correspond to an affine model as discussed previously. With respect to encoding, a device for video encoding a current block of video data, using division by one or more digital constants for an affine model in video coding, may include one or more processors. The one or more processors may be configured to compute a horizontal component of a motion vector of the affine-model, if the affine model is a four-parameter affine model, based on a first bit-shift operation on a first difference product and a second difference product, and includes adding a result of the first bit-shift operation to a zeroth control point motion vector horizontal component. The first difference product includes multiplying a first difference by a horizontal pixel location within the current block of video data, and the second difference product includes multiplying a second difference by a vertical pixel location within the current block of video data. The first difference is based on a difference between horizontal components of the zeroth control point motion vector and a first control point motion vector. The second difference is based on a difference between vertical components of the zeroth control point motion vector and the first control point motion vector.

Otherwise, if the affine model is a six-parameter affine model, the one or more processors may be configured to compute a horizontal component of a motion vector of the affine-model, based on a first bit-shift operation on a first difference product and a second difference product and includes adding the result of the first bit-shift operation to the zeroth control point motion vector horizontal component. The first difference product includes multiplying a first difference by the horizontal pixel location within the current block of video data, and the second difference product includes multiplying a second difference by the horizontal pixel location within the current block of video data. The first difference is based on a difference between horizontal components of the zeroth control point motion vector and the first control point motion vector, and the second difference is based on a difference between horizontal components of the zeroth control point motion vector and a second control point motion vector. In addition, the one or more processors may be configured to compute a vertical component of a motion vector of the affine-model, if the affine model is the four-parameter affine model, based on a second bit-shift operation on a third difference product and a fourth difference product, and includes adding a result of the second bit-shift operation to the zeroth control point motion vector vertical component.

The third difference product includes multiplying a third difference by a horizontal pixel location within the current block of video data, and the fourth difference product includes multiplying a fourth difference by a vertical pixel location within the current block of video data, and wherein the third difference is based on a difference between horizontal components of the zeroth control point motion vector and the first control point motion vector, and the fourth difference is based on a difference between vertical components of the zeroth control point motion vector and the first control point motion vector.

Otherwise, if the affine model is the six parameter affine model, the one or more processors are configured to compute a vertical component of a motion vector of the affine-model, if the affine model, based on a second bit-shift operation on a third difference product and a fourth difference product and includes adding the result of the second bit-shift operation to the zeroth control point motion vector vertical component.

The third difference product includes multiplying a third difference by the horizontal pixel location within the current block of video data, and the fourth difference product includes multiplying a fourth difference by a vertical pixel location within the current block of video data. The third difference is based on a difference between vertical components of the zeroth control point motion vector and a first control point motion vector, and the fourth difference is based on difference between vertical components of the zeroth control point motion vector and a second control point motion vector. The device for encoding may also include a memory configured to store a bitstream representing the horizontal component and vertical component of the motion vector of the affine model, wherein the affine model is either the four-parameter affine model or the six-parameter affine model.

The third difference of the four-parameter affine model is the second difference of the four-parameter affine model multiplied by a minus 1. The fourth difference of the four-parameter affine model is the first difference of the four-parameter affine model.

The zeroth control point motion vector horizontal component, the first control point motion vector horizontal component, the second control point motion vector horizontal component, the zeroth point motion vector vertical component, the first control point motion vector vertical component, and the second control point motion vector are each bit-shifted by an integer number.

Other embodiments for different forms of affine models (described above) may also be implemented in video encoder 20. For clarify purposes, the information described above with respect to the numerous affine forms are not repeated here.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, ALF, and/or GALF, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 9:
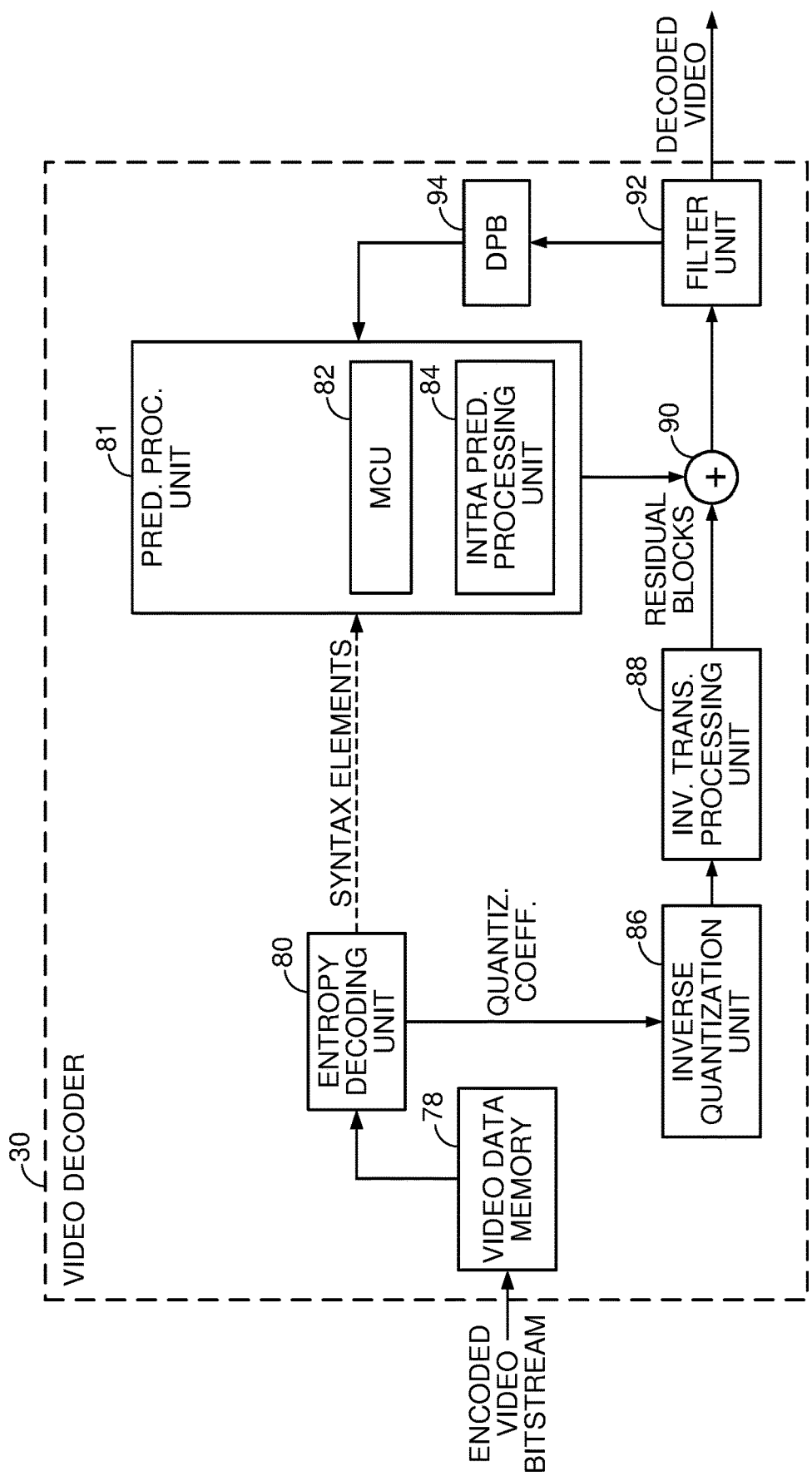
FIG. 9 illustrates an exemplary video decoder that may be used to implement one or more of the techniques described in this disclosure.

FIG. 9 is a block diagram illustrating an example video decoder 30 that may implement the techniques described in this disclosure. Video decoder 30 of FIG. 9 may, for example, be configured to receive the signaling described above with respect to video encoder 20 of FIG. 8. In the example of FIG. 9, the video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20.

One or more units illustrated within the video decoder 30 may be part of an Application Specific Integrated Circuit (ASIC). Alternatively, or in addition to, one or more units illustrated within the video decoder 30 may be implemented in one processor, or, alternatively in other embodiments in one or more processors.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by a same value memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces a final predictive blocks for a video block of the current video slice based on the motion vectors and other syntax elements received from entropy decoding unit 80. The final predictive blocks may be produced from one of the reference pictures within one of the reference picture lists.

The prediction processing unit 81 may also be part of one or more processors which may be configured to operate in a merge mode which processes the candidate list.

In such a mode, the one or more processors may be configured to receive a one or more bits, in the bitstream, that represent a flag, and indicate the encoded current block of video data was encoded based on a candidate list that includes motion vector candidates based on one or more translational motion vectors, and motion vector candidates based on one or more affine motion vectors. The one or more processors may be configured to also receive a merge index that indicates which candidate in the candidate list. The construction may be of a candidate list that comprises either normal merge candidates or, affine merge candidates, or in some embodiments both. That is, the video decoder may also construct the candidate list based on neighboring candidate blocks. The decoder may then select one or more motion vectors of a candidate from the candidate list, based on the merge index, where the candidate has one or more of the motion vectors corresponding to the translational motion vectors or affine motion vectors within the candidate list. Moreover, the video decoder may determine, based on the selected one or more motion vectors from the candidate list, a predictor block of video data. The predictor block may be a final generated prediction block mentioned above, and reconstruct the current block of video data based on the predictor block of video data. The reconstructed current block of video data may be stored in a memory, e.g. DBP 94.

The prediction processing unit 81 may be part of one or more processors which may be configured to reconstruct the current block of video data and may be reconstructed based on prediction blocks using the motion vectors of the normal merge candidate or affine merge candidate in the candidate list.

Moreover, the motion vectors used for prediction may also be from spatial or temporal neighboring candidate blocks. As an example, a first prediction block and a second prediction block are generated using motion vectors from neighboring candidate blocks. In another example, the first prediction block and the second prediction block are generated using motion vectors of spatially neighboring block. In another example, the first prediction block and the second prediction block are generated using temporally neighboring blocks. In another example, the neighboring blocks are within the group of a same value: slice, or tile or LCU or ROW or picture.

The motion vectors may be calculated as part of an affine model. The video decoder 30 may decode a current block of video data, using division by one or more digital constants for an affine model in video coding. The video decoder 30 may include one or more processors configured to compute a horizontal component of a motion vector of the affine-model, if the affine model is a four-parameter affine model, based on a first bit-shift operation on a first difference product and a second difference product, and includes adding a result of the first bit-shift operation to a zeroth control point motion vector horizontal component. The first difference product includes multiplying a first difference by a horizontal pixel location within the current block of video data, and the second difference product includes multiplying a second difference by a vertical pixel location within the current block of video data. The first difference is based on a difference between horizontal components of the zeroth control point motion vector and a first control point motion vector. The second difference is based on a difference between vertical components of the zeroth control point motion vector and the first control point motion vector.

Otherwise, if the affine model is a six-parameter affine model, the one or more processors may be configured to compute a horizontal component of a motion vector of the affine-model, based on a first bit-shift operation on a first difference product and a second difference product and includes adding the result of the first bit-shift operation to the zeroth control point motion vector horizontal component. The first difference product includes multiplying a first difference by the horizontal pixel location within the current block of video data, and the second difference product includes multiplying a second difference by the horizontal pixel location within the current block of video data. The first difference is based on a difference between horizontal components of the zeroth control point motion vector and the first control point motion vector, and the second difference is based on a difference between horizontal components of the zeroth control point motion vector and a second control point motion vector. In addition, the one or more processors may be configured to compute a vertical component of a motion vector of the affine-model, if the affine model is the four-parameter affine model, based on a second bit-shift operation on a third difference product and a fourth difference product, and includes adding a result of the second bit-shift operation to the zeroth control point motion vector vertical component.

The third difference product includes multiplying a third difference by a horizontal pixel location within the current block of video data, and the fourth difference product includes multiplying a fourth difference by a vertical pixel location within the current block of video data, and wherein the third difference is based on a difference between horizontal components of the zeroth control point motion vector and the first control point motion vector, and the fourth difference is based on a difference between vertical components of the zeroth control point motion vector and the first control point motion vector.

Otherwise, if the affine model is the six parameter affine model, the one or more processors are configured to compute a vertical component of a motion vector of the affine-model, if the affine model, based on a second bit-shift operation on a third difference product and a fourth difference product and includes adding the result of the second bit-shift operation to the zeroth control point motion vector vertical component.

The third difference product includes multiplying a third difference by the horizontal pixel location within the current block of video data, and the fourth difference product includes multiplying a fourth difference by a vertical pixel location within the current block of video data. The third difference is based on a difference between vertical components of the zeroth control point motion vector and a first control point motion vector, and the fourth difference is based on difference between vertical components of the zeroth control point motion vector and a second control point motion vector. The device for encoding may also include a memory configured to store a bitstream representing the horizontal component and vertical component of the motion vector of the affine model, wherein the affine model is either the four-parameter affine model or the six-parameter affine model.

The third difference of the four-parameter affine model is the second difference of the four-parameter affine model multiplied by a minus 1. The fourth difference of the four-parameter affine model is the first difference of the four-parameter affine model.

The zeroth control point motion vector horizontal component, the first control point motion vector horizontal component, the second control point motion vector horizontal component, the zeroth point motion vector vertical component, the first control point motion vector vertical component, and the second control point motion vector are each bit-shifted by an integer number.

Other embodiments for different forms of affine models (described above) may also be implemented in video decoder 30. For clarify purposes, the information described above with respect to the numerous affine forms are not repeated here.

The video decoder 30 may construct the reference frame lists, List 0 and List 1, using default construction techniques based on reference pictures stored in DPB 94.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. The inverse transform processing unit 88 applies an inverse transform, e.g., an inverse DCT, an inverse integer transform, or a conceptually similar inverse transform process, to the transform coefficients in order to produce residual blocks in the pixel domain.

After the prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, ALF, and/or GALF, and/or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used A person having ordinary skill in the art would recognize that depending on the example, certain acts or events of any of the methods described herein may be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used herein, the term "coding" refers to encoding or decoding. In embodiments using the various forms of coding, a video encoder may code by encoding a video bitstream using one or more of the above features and a video decoder may code by decoding such an encoded bitstream.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code, or instructions may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general. The techniques may be applied to wireless and/or wired applications. In each case, the captured, pre-captured, or computer-generated video may be encoded by the video encoder. The encoded video information may then be output by output interface onto the computer-readable medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in a same value device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold devices." A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example may be that any of the transceivers or antennas described herein that may be "coupled" to a processor, but not necessarily part of the package that includes a video device. Other examples may be inferred from the context disclosed herein, including this paragraph, when using the term "integrated".

As used herein "a wireless" connection between devices may be based on various wireless technologies, such as Bluetooth, Wireless-Fidelity (Wi-Fi) or variants of Wi-Fi (e.g. Wi-Fi Direct. Devices may be "wirelessly connected" based on different cellular communication systems, such as, a Long-Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. In addition, when two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

As used herein A "and/or" B may mean that either "A and B," or "A or B," or both "A and B" and "A or B" are applicable or acceptable.

As used herein, a unit can include, for example, a special purpose hardwired circuitry, software and/or firmware in conjunction with programmable circuitry, or a combination thereof.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

Various examples have been described. These and other examples are within the scope of the following claims.

What is claimed is:

1. A device for video decoding a current block of video data, the device comprising:
   one or more processors are configured to:
      compute a horizontal component of a motion vector of the affine-model by adding a first bit-shift operation result to a zeroth control point motion vector horizontal component, wherein the first bit-shift operation result is determined based on a first bit-shift operation on a first difference product and a second difference product, wherein the first difference product includes a first difference multiplied by a horizontal pixel location within the current block of video data, and wherein the first difference is based on a difference between horizontal components of the zeroth control point motion vector and a first control point motion vector; and
      compute a vertical component of a motion vector of the affine-model by adding a second bit-shift operation result to a zeroth control point motion vector vertical component, wherein the second bit-shift operation result is determined based on a second bit shift operation on a third difference product, and wherein the third difference product includes a third difference multiplied by a horizontal pixel location within the current block of video data, and wherein the third difference is based on a difference between vertical components of the zeroth control point motion vector and a first control point motion vector, wherein the affine model is a six-parameter affine model with a division by a number that is not a power of 2, and the second difference product includes a second difference multiplied by a vertical pixel location within the current block of video data, and the second difference is based on a difference between vertical components of the zeroth control point motion vector and the second control point motion vector, and the fourth difference product includes a fourth difference multiplied by a vertical pixel location within the current block of video data, and the fourth difference is based on a difference between vertical components of the zeroth control point motion vector and the second control point motion vector; and
   a memory configured to reconstruct the current block of video data.

2. The device of claim 1, wherein the six-parameter affine model is an affine model form (10), wherein prior to the first bit-shift operation, a look-up-table, T, is read at a pixel location w, along a width or a height of the current block of video data, T[w], and T[w] is multiplied by the first difference product, and T[w] is also multiplied by the second difference product, then the first bit-shift operation by the first digital constant is applied on the first difference product multiplied by T[w], and the first bit-shift operation by the first digital constant is applied on the second difference product multiplied by T[w], and, wherein prior to the second bit-shift operation, the T[w] multiplied by the first difference product and the T[w] multiplied by the second difference product are used, then the second bit-shift operation by the second digital constant is applied on the second difference product multiplied by T[w], and the second bit-shift operation by the second digital constant is applied on the first difference product multiplied by T[w], and, wherein the first digital constant and the second digital constant are a same value, and the first digital constant, tb, is a positive integer number between 1 and 7, and, wherein the first control point motion vector horizontal component is defined as $mv_{1x}$, and, wherein the zeroth control point motion vector horizontal component is defined as $mv_{0x}$, and, wherein the first control point motion vector vertical component is defined as $mv_{1y}$, and, wherein the zeroth control point motion vector vertical component is defined as $mv_{0y}$, and, wherein the second difference and the third difference are an equivalent value, and, wherein the first difference and the fourth difference are an equivalent value.

3. The device of claim 1, wherein the six-parameter affine model is an affine model form (11), wherein prior to the first bit-shift operation, a look-up-table, T, is read at a pixel location w, along a width of the current block of video data, T[w], and T[w] is multiplied by the difference between the first difference product and the second difference product, and then the first bit-shift operation by the first digital constant is applied on the first difference product and the second difference product multiplied by T[w], and wherein prior to the second bit-shift operation, a look-up-table, T, is read at a pixel location w, along a height of the current block of video data, T[w], and T[w] is multiplied by the difference between the third difference product and the fourth difference product, and the second bit-shift operation by the second digital constant is applied on the third difference product and the fourth difference product multiplied by T[w], and, wherein the first digital constant and the second digital constant are a same value, and the first digital constant, tb, is a positive integer number between 1 and 7, and, wherein the first control point motion vector horizontal component is defined as $mv_{1x}$, and, wherein the zeroth control point motion vector horizontal component is defined as $mv_{0x}$, and, wherein the first control point motion vector vertical component is defined as $mv_{1y}$, and, wherein the zeroth control point motion vector vertical component is defined as $mv_{0y}$, and, wherein the second difference and the third difference are an equivalent value, and, wherein the first difference and the fourth difference are an equivalent value.

4. The device of claim 1, wherein the six-parameter affine model is an affine model form (11), wherein prior to the first bit-shift operation, a look-up-table, T, is read at a pixel location w, along a width of the current block of video data, T[w], and T[w] is multiplied by the difference between the first difference product and the second difference product, and then the first bit-shift operation by the first digital constant is applied on the first difference product and the second difference product multiplied by T[w], and wherein prior to the second bit-shift operation, a look-up-table, T, is read at a pixel location w, along a height of the current block of video data, T[w], and T[w] is multiplied by the difference between the third difference product and the fourth difference product, and the second bit-shift operation by the second digital constant is applied on the third difference product and the fourth difference product multiplied by T[w], and, wherein the first digital constant and the second digital constant are a same value, and the first digital constant, tb, is a positive integer number between 1 and 7, and, wherein the first control point motion vector horizontal component is defined as $mv_{1x}$, and, wherein the zeroth control point motion vector horizontal component is defined as $mv_{0x}$, and, wherein the first control point motion vector vertical component is defined as $mv_{1y}$, and, wherein the zeroth control point motion vector vertical component is defined as $mv_{0y}$, and, wherein the second difference and the third difference are an equivalent value, and, wherein the first difference and the fourth difference are an equivalent value.

5. A method for video decoding a current block of video data, the method comprising:

computing a horizontal component of a motion vector of the affine-model by adding a first bit-shift operation result to a zeroth control point motion vector horizontal component, wherein the first bit-shift operation result is determined based on a first bit-shift operation on a first difference product and a second difference product, wherein the first difference product includes a first difference multiplied by a horizontal pixel location within the current block of video data, and wherein the first difference is based on a difference between horizontal components of the zeroth control point motion vector and a first control point motion vector; and computing a vertical component of a motion vector of the affine-model by adding a second bit-shift operation result to a zeroth control point motion vector vertical component, wherein the second bit-shift operation result is determined based on a second bit shift operation on a third difference product, and wherein the third difference product includes a third difference multiplied by a horizontal pixel location within the current block of video data, and wherein the third difference is based on a difference between vertical components of the zeroth control point motion vector and a first control point motion vector, wherein the affine model is a six-parameter affine model with a division by a number that is not a power of 2, and the computing the horizontal component is part of the six-parameter affine model, and wherein the and the second difference product includes a second difference multiplied by a vertical pixel location within the current block of video data, and the second difference is based on a difference between vertical components of the zeroth control point motion vector and the second control point motion vector, and compute the vertical component of the affine model when the affine model is a six-parameter affine model, and the fourth difference product includes a fourth difference multiplied by a vertical pixel location within the current block of video data, and the fourth difference is based on a difference between vertical components of the zeroth control point motion vector and the second control point motion vector; and reconstructing the current block of video data.

6. The method of claim 5, wherein the six-parameter affine model is an affine model form (10), wherein prior to the first bit-shift operation, a look-up-table, T, is read at a pixel location w, along a width or a height of the current block of video data, T[w], and T[w] is multiplied by the first difference product, and T[w] is also multiplied by the second difference product, then the first bit-shift operation by the first digital constant is applied on the first difference product multiplied by T[w], and the first bit-shift operation by the first digital constant is applied on the second difference product multiplied by T[w], and, wherein prior to the second bit-shift operation, the T[w] multiplied by the first difference product and the T[w] multiplied by the second difference product are used, then the second bit-shift operation by the second digital constant is applied on the second difference product multiplied by T[w], and the second bit-shift operation by the second digital constant is applied on the first difference product multiplied by T[w], and, wherein the first digital constant and the second digital constant are a same value, and the first digital constant, tb, is a positive integer number between 1 and 7, and, wherein the first control point motion vector horizontal component is defined as $mv_{1x}$, and, wherein the zeroth control point motion vector horizontal component is defined as $mv_{0x}$, and, wherein the first control point motion vector vertical component is defined as $mv_{1y}$, and, wherein the zeroth control point motion vector vertical component is defined as $mv_{0y}$, and, wherein the second difference and the third difference are an equivalent value, and, wherein the first difference and the fourth difference are an equivalent value.

7. The method of claim 5, wherein the six-parameter affine model is an affine model form (11), wherein prior to the first bit-shift operation, a look-up-table, T, is read at a pixel location w, along a width of the current block of video data, T[w], and T[w] is multiplied by the difference between the first difference product and the second difference product, and then the first bit-shift operation by the first digital constant is applied on the first difference product and the second difference product multiplied by T[w], and wherein prior to the second bit-shift operation, a look-up-table, T, is read at a pixel location w, along a height of the current block of video data, T[w], and T[w] is multiplied by the difference between the third difference product and the fourth difference product, and the second bit-shift operation by the second digital constant is applied on the third difference product and the fourth difference product multiplied by T[w], and, wherein the first digital constant and the second digital constant are a same value, and the first digital constant, tb, is a positive integer number between 1 and 7, and, wherein the first control point motion vector horizontal component is defined as $mv_{1x}$, and, wherein the zeroth control point motion vector horizontal component is defined as $mv_{0x}$, and, wherein the first control point motion vector vertical component is defined as $mv_{1y}$, and, wherein the zeroth control point motion vector vertical component is defined as $mv_{0y}$, and, wherein the second difference and the third difference are an equivalent value, and, wherein the first difference and the fourth difference are an equivalent value.

8. The method of claim 5, wherein the six-parameter affine model is an affine model form (11), wherein prior to the first bit-shift operation, a look-up-table, T, is read at a pixel location w, along a width of the current block of video data, T[w], and T[w] is multiplied by the difference between the first difference product and the second difference product, and then the first bit-shift operation by the first digital constant is applied on the first difference product and the second difference product multiplied by T[w], and wherein prior to the second bit-shift operation, a look-up-table, T, is read at a pixel location w, along a height of the current block of video data, T[w], and T[w] is multiplied by the difference between the third difference product and the fourth difference product, and the second bit-shift operation by the second digital constant is applied on the third difference product and the fourth difference product multiplied by T[w], and, wherein the first digital constant and the second digital constant are a same value, and the first digital constant, tb, is a positive integer number between 1 and 7, and, wherein the first control point motion vector horizontal component is defined as $mv_{1x}$, and, wherein the zeroth control point motion vector horizontal component is defined as $mv_{0x}$, and, wherein the first control point motion vector vertical component is defined as $mv_{1y}$, and, wherein the zeroth control point motion vector vertical component is defined as $mv_{0y}$, and, wherein the second difference and the third difference are an equivalent value, and, wherein the first difference and the fourth difference are an equivalent value.

9. A device for video encoding a current block of video data, the device comprising:
  one or more processors configured to:
    compute a horizontal component of a motion vector of the affine-model by adding a first bit-shift operation result to a zeroth control point motion vector horizontal component, wherein the first bit-shift operation result is determined based on a first bit-shift operation on a first difference product and a second difference product, wherein the first difference product includes a first difference multiplied by a horizontal pixel location within the current block of video data, and wherein the first difference is based on a difference between horizontal components of the zeroth control point motion vector and a first control point motion vector; and
    compute a vertical component of a motion vector of the affine-model by adding a second bit-shift operation result to a zeroth control point motion vector vertical component, wherein the second bit-shift operation result is determined based on a second bit shift operation on a third difference product, and wherein the third difference product includes a third difference multiplied by a horizontal pixel location within the current block of video data, and wherein the third difference is based on a difference between vertical components of the zeroth control point motion vector and a first control point motion vector, wherein the affine model is a six-parameter affine model with a division by a number that is not a power of 2, and the second difference product includes a second difference multiplied by a vertical pixel location within the current block of video data, and the second difference is based on a difference between vertical components of the zeroth control point motion vector and the second control point motion vector, and the fourth difference product includes a fourth difference multiplied by a vertical pixel location within the current block of video data, and the fourth difference is based on a difference between vertical components of the zeroth control point motion vector and the second control point motion vector; and
  a memory configured to store a bitstream representing the horizontal component and vertical component of the motion vector of the affine model.

10. The device of claim 1, wherein the six-parameter affine model is an affine model form (16) which is the six-parameter affine model, wherein prior to the first bit-shift operation, a look-up-table, T, is read at a pixel location w, along a width of the current block of video data, T[w], and T[w] is multiplied by the first difference product, and T, is read at a pixel location h, along a height of the current block of video data, T[h], and is multiplied by the second difference product, then the first bit-shift operation by the first digital constant is applied on the first difference product multiplied by T[w], and wherein the first bit-shift operation by the first digital constant is applied on the second difference product multiplied by T[h], wherein prior to the second bit-shift operation, T[w] is multiplied by the third difference product, T[h] is multiplied by the fourth difference product, then the second bit-shift operation by the first digital constant is applied on the third difference product multiplied by T[w], wherein the second bit-shift operation by the second digital constant is applied on the fourth difference product multiplied by T[h], and, and the first digital constant and the second digital constant are the same, and the first digital constant, tb, is a positive number between 1 and 7.

11. The method of claim 5, wherein the six-parameter affine model is an affine model form (16) which is the six-parameter affine model, wherein prior to the first bit-shift operation, a look-up-table, T, is read at a pixel location w, along a width of the current block of video data, T[w], and T[w] is multiplied by the first difference product, and T, is read at a pixel location h, along a height of the current block of video data, T[h], and is multiplied by the second difference product, then the first bit-shift operation by the first digital constant is applied on the first difference product multiplied by T[w], and wherein the first bit-shift operation by the first digital constant is applied on the second difference product multiplied by T[h], wherein prior to the second bit-shift operation, T[w] is multiplied by the third difference product, T[h] is multiplied by the fourth difference product, then the second bit-shift operation by the first digital constant is applied on the third difference product multiplied by T[w], wherein the second bit-shift operation by the second digital constant is applied on the fourth difference product multiplied by T[h], and, and the first digital constant and the second digital constant are the same, and the first digital constant, tb, is a positive number between 1 and 7.

* * * * *